(12) United States Patent
Kumada

(10) Patent No.: US 6,337,922 B2
(45) Date of Patent: *Jan. 8, 2002

(54) IMAGE PROCESS METHOD, IMAGE PROCESS APPARATUS AND STORAGE MEDIUM

(75) Inventor: Shuichi Kumada, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,327

(22) Filed: Jan. 29, 1998

(30) Foreign Application Priority Data

Jan. 16, 1997 (JP) .......................................... 10-006534
Jan. 31, 1997 (JP) ........................................... 9-018775

(51) Int. Cl.⁷ ............................................... G06K 9/00
(52) U.S. Cl. ....................... 382/162; 382/167; 345/604; 358/518; 358/1.9
(58) Field of Search ................................ 382/162, 166, 382/167; 358/1.1, 1.6, 1.15, 1.2, 1.9, 500–518; 395/118; 707/528; 345/431, 150–155, 600–604

(56) References Cited

U.S. PATENT DOCUMENTS

| | | | | |
|---|---|---|---|---|
| 4,991,108 A | * | 2/1991 | Hamilton ..................... | 358/1.6 |
| 5,634,092 A | * | 5/1997 | Stokes ......................... | 395/118 |
| 5,720,013 A | * | 2/1998 | Uda et al. .................... | 395/114 |
| 5,724,442 A | * | 3/1998 | Ogatsu ........................ | 382/167 |
| 5,806,081 A | * | 9/1998 | Swen et al. .................. | 707/528 |
| 5,854,940 A | * | 12/1998 | Niihara ....................... | 358/1.6 |
| 5,884,014 A | * | 3/1999 | Huttenlocher et al. ...... | 395/114 |
| 5,926,559 A | * | 7/1999 | Ohta ........................... | 382/162 |
| 6,043,909 A | * | 3/2000 | Holub ......................... | 358/504 |
| 6,044,173 A | * | 3/2000 | Kumada ..................... | 382/167 |
| 6,226,011 B1 | * | 5/2001 | Sakuyama et al. .......... | 345/431 |

OTHER PUBLICATIONS

ICC PROFILE Format Specification, Version 3.3 International Color Consortium pp 1–5, 16–22, 72, 108–112 & Chap 6 & Annex A, Nov. 11, 1996.*

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

Color matching is performed in a network system using a communication device which communicates with a network server storing plural device profiles and color management modules. A selection device selected a device profile, based on kinds of the plural device profiles inputted through the communication device, and a controller downloads the selected device profile and a color management module from the network server. A color matching processor performs a color matching process on input image data by using the downloaded device profile and the downloaded color management module.

11 Claims, 31 Drawing Sheets

FIG. 16

```
┌─────────────────────────────────┐
│      SCANNER DESIGNATION        │
│                                 │
│        ⦿   YES                  │
│                                 │
│        ○   NO                   │
│                                 │
│      ( OK )                     │
│                                 │
└─────────────────────────────────┘
```

FIG. 17

| SCANNER LIST |
|---|
| → C COMPANY A-4015 |
| C COMPANY A-4025 |
| C COMPANY A-300 |
| C COMPANY A-600 |

( SELECT )

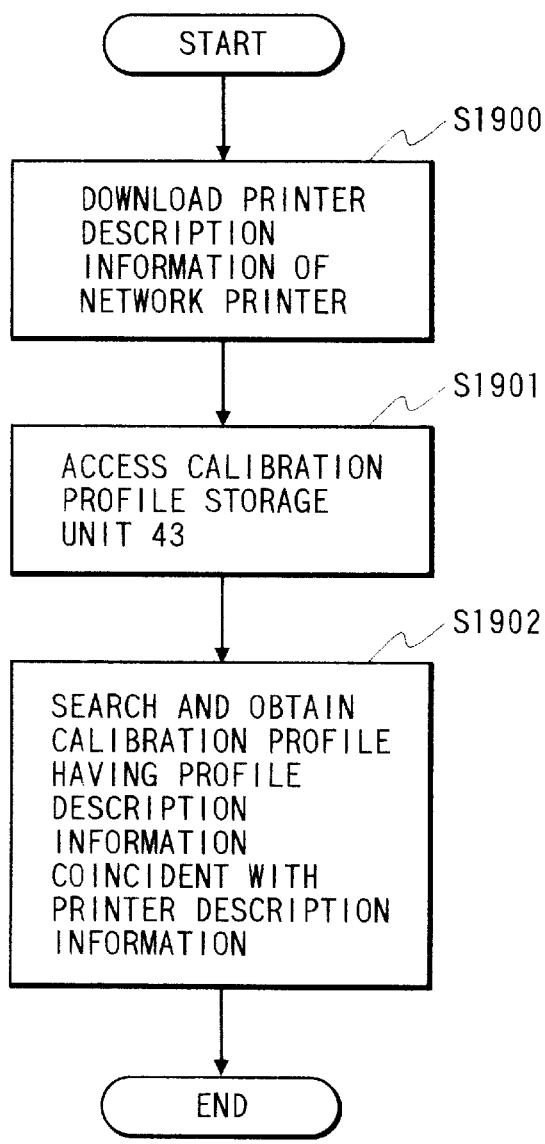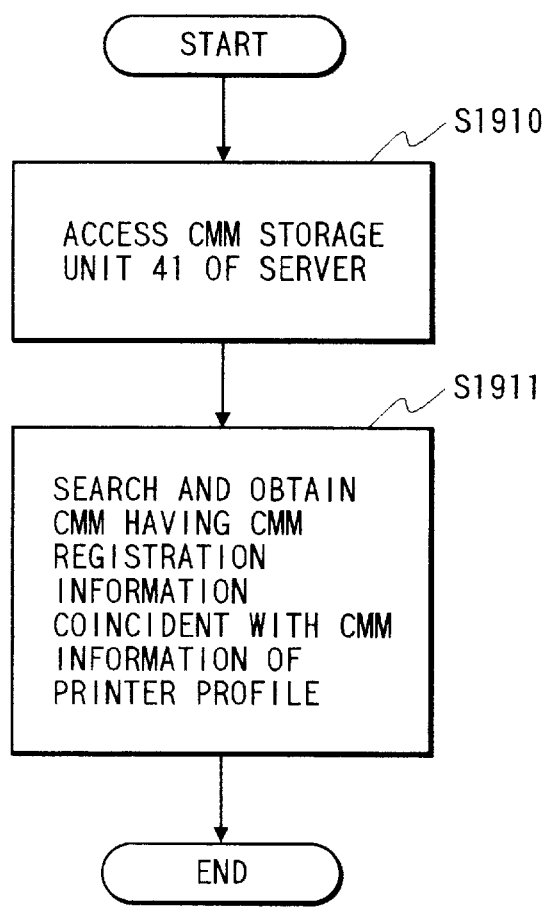

IMAGE PROCESS METHOD, IMAGE PROCESS APPARATUS AND STORAGE MEDIUM

BACKGROUND OF THE INVENTION

1. Field of the Invention

The present invention relates to an image process apparatus and method for performing a color matching process.

2. Related Background Art

As described in U.S. patent application Ser. No. 08/380,633 which was filed on Jan. 30, 1995, which is assigned to the assignee of the present invention, and is based on Japanese Patent Application No. 6-9565 filed in Japan on Jan. 31, 1994, a color management system composed of a CMM (color management module) and a device profile performs a color conversion process to perform color matching between input and output images by using a profile corresponding to a source device before conversion and a profile corresponding to a destination device after conversion.

The former profile is called as a source profile, and the latter profile is called as a destination profile.

For example, in the color conversion process shown in FIG. 1, a scanner color space (i.e., scanner RGB) or a monitor color space (i.e., monitor RGB) is converted into a printer color space (i.e., printer CMYK).

In this case, since the source device is a scanner or a monitor, the profile of the scanner or the monitor is handled as the source profile. On the other hand, since the destination device is a printer, the profile of the printer is handled as the destination profile.

FIG. 2 is a view showing an example of the structure of the device profile.

The profile is divided into a header portion and a data storage portion. In the header portion, information which is used to manage the profile is stored. For example, as such information, there are device information representing which device (e.g., monitor) the profile corresponds to, CMM information representing which CMM the profile is used for, and the like. On the other hand, in the data storage portion, profile description information for discriminating the profile is stored. As the profile description information, e.g., information representing a maker name and a product name is stored.

Conventionally, the above-described color management system has not been realized in a network system.

For this reason, there has been a drawback that it is difficult to perform color matching in the network.

SUMMARY OF THE INVENTION

An object of the first embodiment of the invention is to enable a color matching process in a network system.

In order to achieve the above object, the first embodiment of the invention provides an image process apparatus, comprising:

a communication means for communicating with a network server storing plural device profiles and color management modules;

a selection means for selecting the device profile, based on kinds of the plural device profiles inputted through the communication means;

a control means for downloading the selected device profile and the color management module from the network server; and a color matching process means for performing a color matching process on input image data by using the downloaded color management module and the downloaded device profile.

An object of the second embodiment of the invention is to high-accurately realize color matching according to use.

In order to achieve the above object, the second embodiment of the invention provides an image process apparatus which performs a color matching process on an original containing an image portion and a portion other than image, the apparatus comprising:

an extraction means for extracting a profile added to an image file; and a color matching process means for performing the color matching process on the original, wherein the color matching process means performs the color matching process on the image portion by using the extracted profile as a source profile, and the color matching process means performs the color matching process on the portion other than image by using a monitor profile as the source profile.

The above and other objects, features, and advantages of the present invention will be apparent from the following detailed description and the appended claims in conjunction with the accompanying drawings.

BRIEF DESCRIPTION OF THE DRAWINGS

FIG. 16 is a view showing an example of a user interface in case of a step S105 of FIG. 4 or a step S208 of FIG. 6;

FIG. 17 is a view showing an example of a user interface in case of the step S106 of FIG. 4 or the step S210 of FIG. 6;

FIG. 40 is a flow chart showing a detailed process wherein a printer profile in which calibration data of the network printer 50 has been stored is obtained by the network server 40; and FIG. 41 is a flow chart showing a process wherein a CMM used for the color matching process is obtained by the network server 40.

DETAILED DESCRIPTION OF THE PREFERRED EMBODIMENTS

First Embodiment

Hereinafter, one embodiment of the present invention will be explained with reference to the accompanying drawings.

Figure 1:
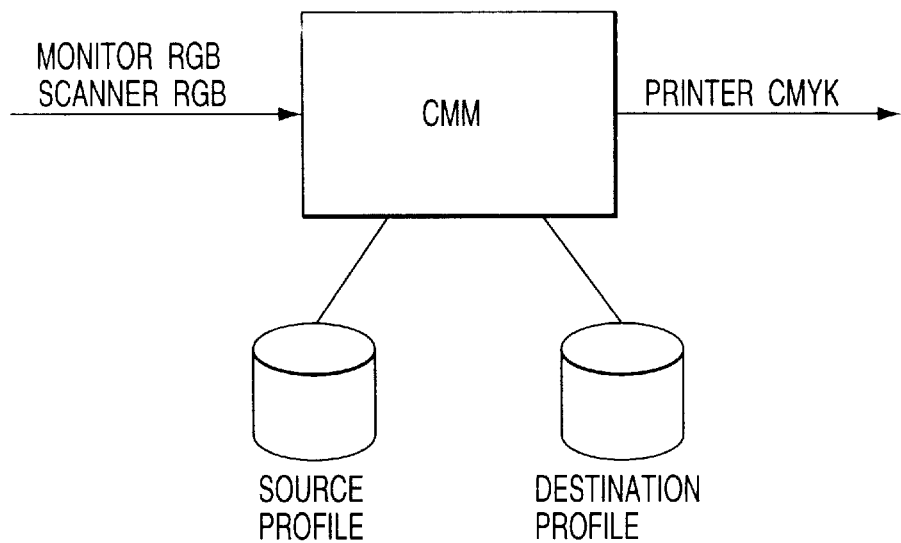
FIG. 1 is a view showing a concept of a color management system.
Figure 2:
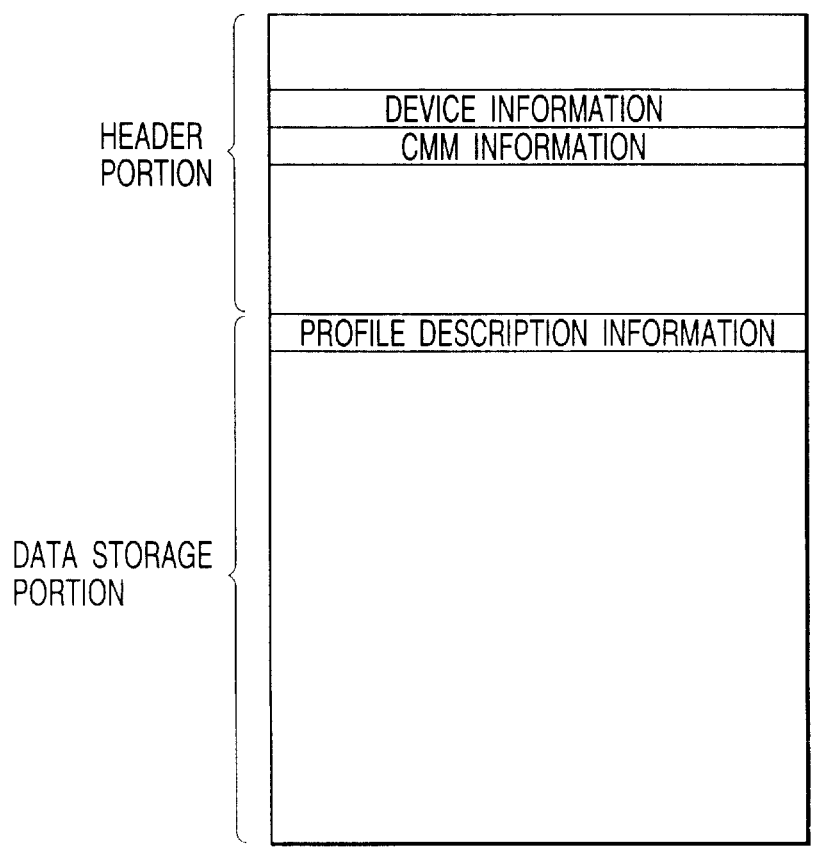
FIG. 2 is a view showing an example of the structure of a device profile.
Figure 3:
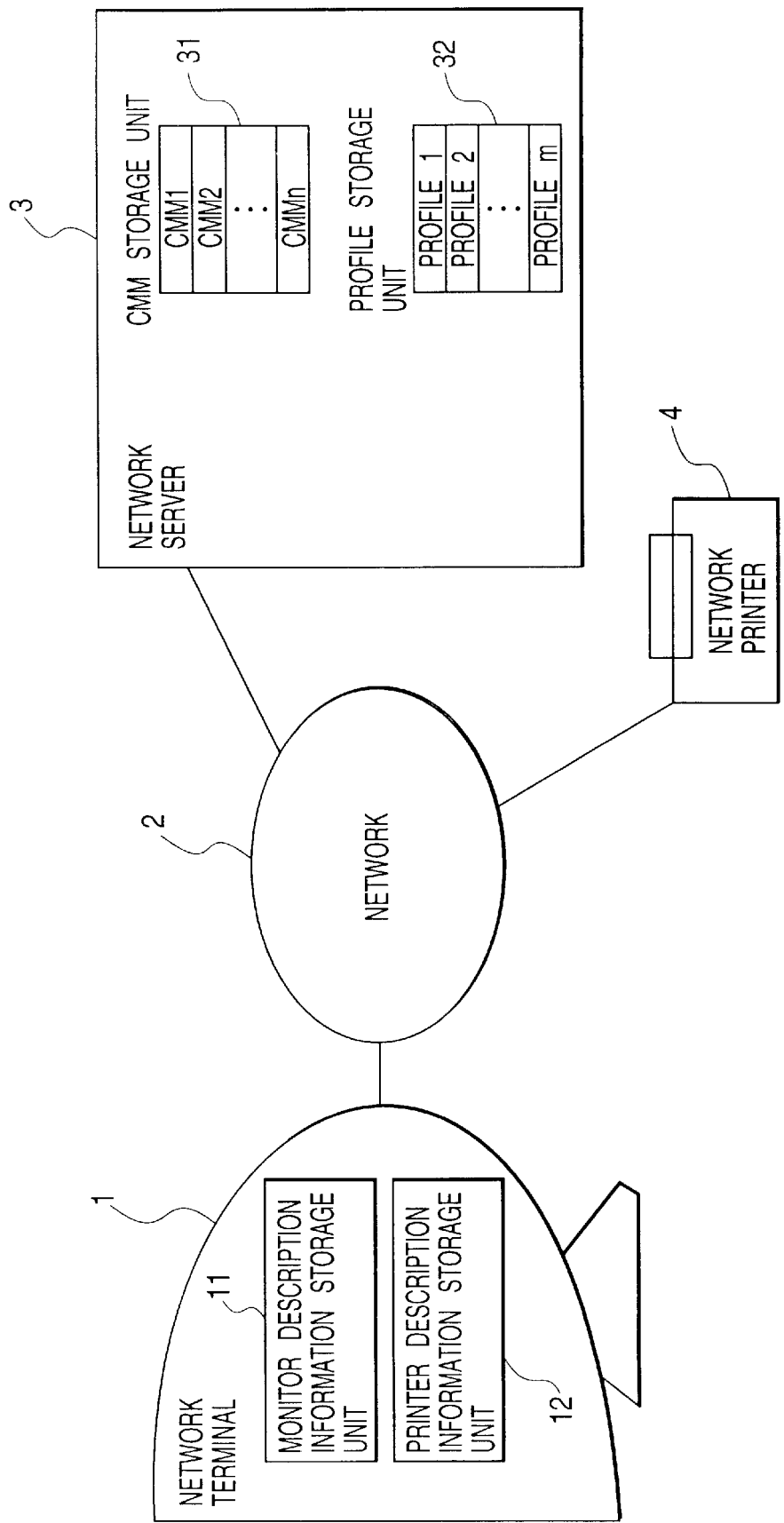
FIG. 3 is a view showing the structure of a network system according to one embodiment of the present invention.

FIG. 3 is a view showing the structure of a network system according to one embodiment of the present invention.

As shown in FIG. 3, the network system according to the present embodiment is composed of a network terminal 1, a network server 3 and a network printer 4, and a network 2 to which these three devices are connected.

The network terminal 1 has a CPU, a VRAM and the like necessary for monitor displaying and image processing, and a communication function necessary for communication in the network. Further, the network terminal 1 has a monitor description information storage unit 11 for discriminating a monitor and a printer description information storage unit 12 for discriminating the network printer 4.

The network server 3 has a CPU, a RAM, a hard disk and the like necessary for image processing and printing processing, and a communication function necessary for the communication in the network. Further, the network server 3 has a CMM (color management module) storage unit 31 in which n (constant) CMMs have been stored or registered and a profile storage unit 32 in which m (constant) device profiles (monitor, scanner and printer) have been stored. Each CMM registered in the CMM storage unit 31 has registration information (e.g., four-byte English numerals) for discrimination.

Figure 4:
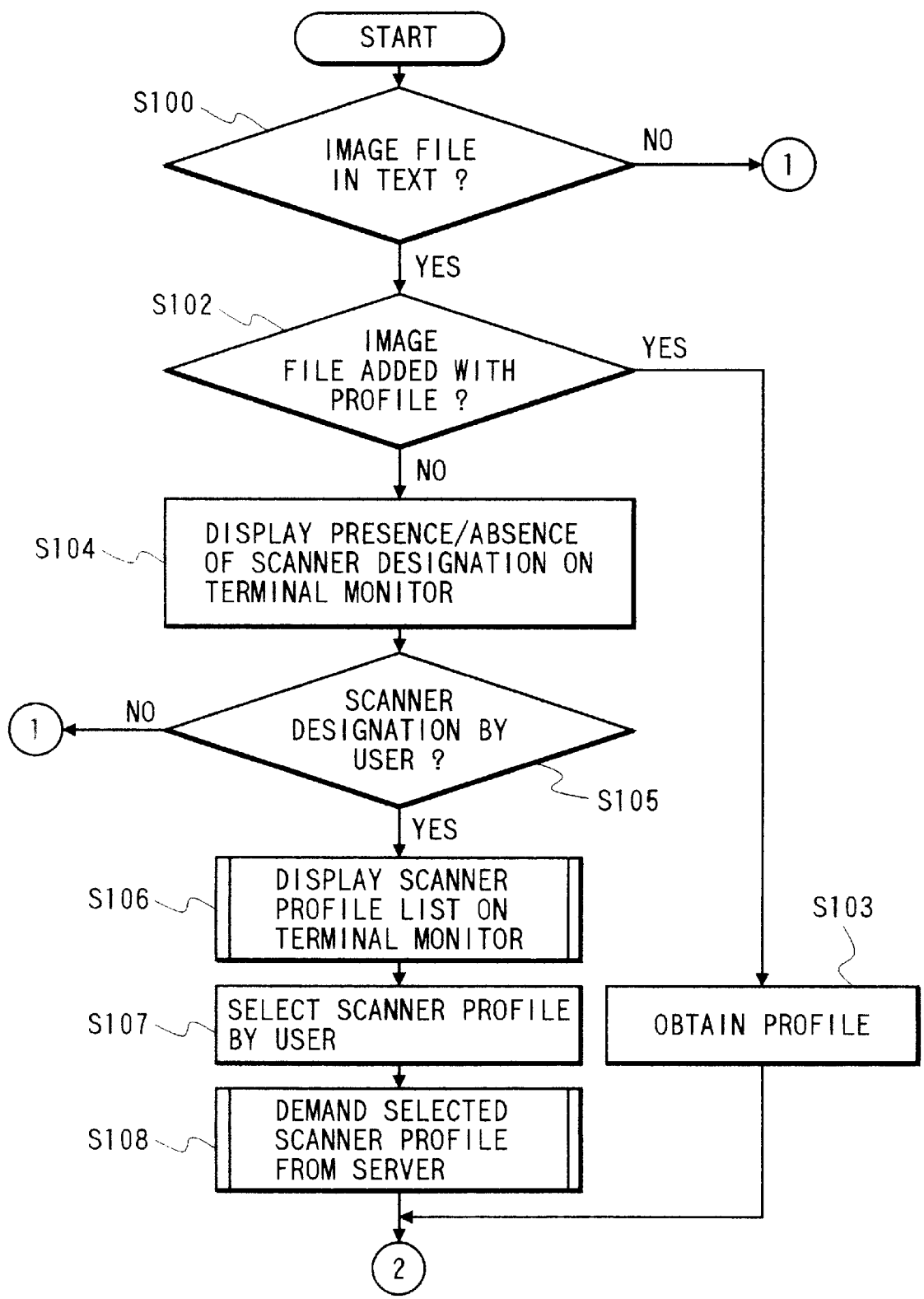
FIG. 4 is a flow chart showing a process wherein, in case of displaying a text on a network terminal 1, if there is an image file in the text, a color matching process on image data in the image file is performed by a network terminal 1 in accordance with a characteristic of a monitor, and a processed result is displayed on the monitor.
Figure 5:
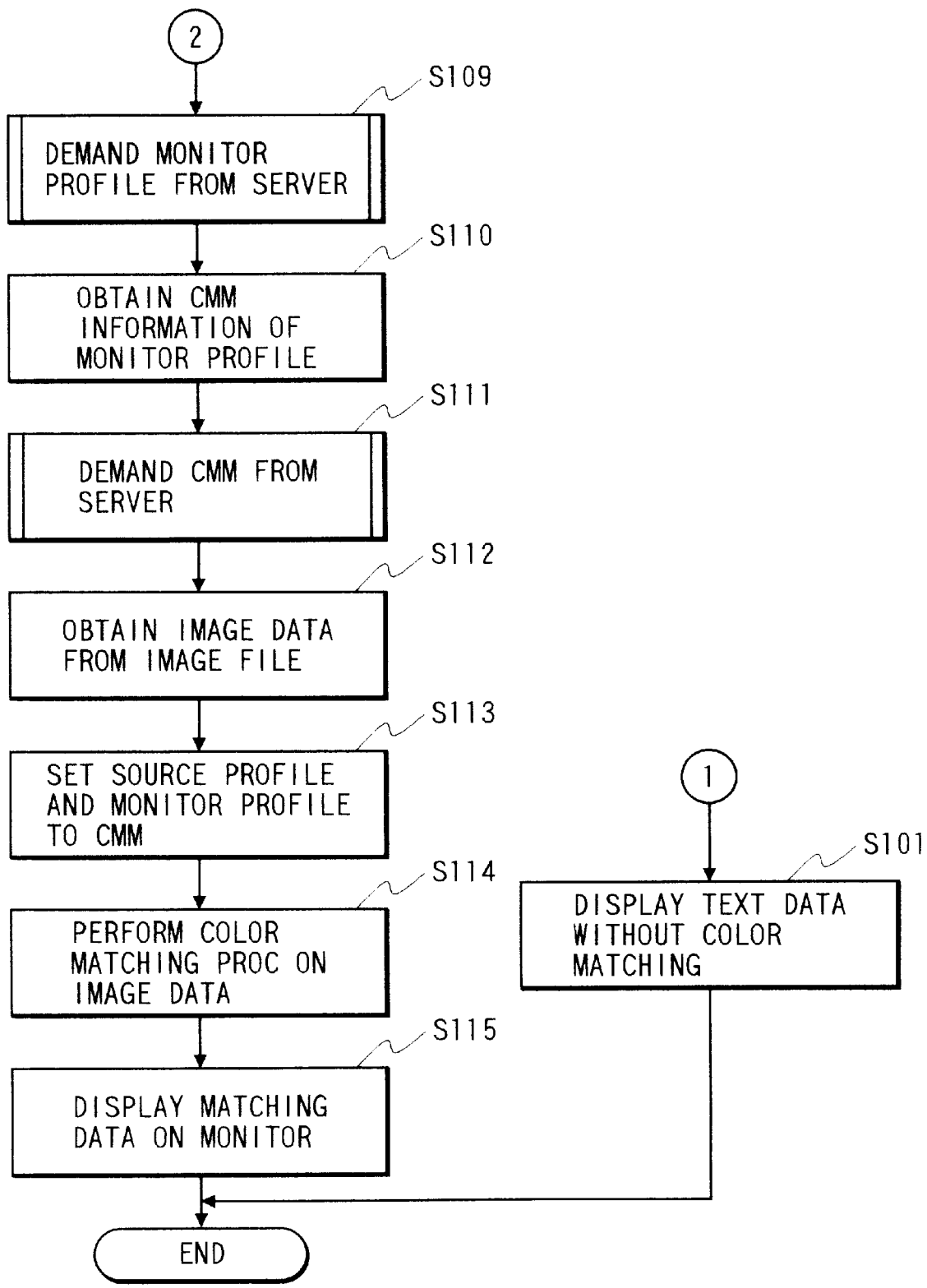
FIG. 5 is a flow chart showing the process wherein, in case of displaying the text on the network terminal 1, if there is the image file in the text, the color matching process on the image data in the image file is performed by the network terminal 1 in accordance with the characteristic of the monitor, and the processed result is displayed on the monitor.

FIGS. 4 and 5 are flow charts showing a process wherein, in case of displaying a text on the network terminal 1, if an image file exists in the text, a color matching process on image data in the image file is performed by the network terminal 1 in accordance with a characteristic of the monitor, and the processed data is displayed on the monitor.

In a step S100, it is checked whether or not the image file exists in the text to be displayed. If the image file does not exist, the flow advances to a step S101 to display text data without performing any matching process, and then the process terminates. On the other hand, if the image file exists, the flow advances to a step S102 to check whether or not the profile is being added to the image file.

If it is found in the step S102 that the profile is being added, the flow advances to a step S103 to obtain (or fetch) the profile, and the flow further advances to a step S109.

If it is found in the step S102 that the profile is not added, the flow advances to a step S104 to display whether or not the scanner which read the image data is to be designated on the monitor.

In the step S105, a result of a user instruction indicating whether or not it designates the scanner is checked. If it is indicated that the user instruction does not designate the scanner, the flow advances to the step S101 to display the text data without performing any matching process, and then the process terminates. This is the case where a user can not specify or identify the scanner which read the image data.

On the other hand, if it is indicated in the step S105 that the user instruction designates the scanner, the flow advances to a step S106. This is the case where the user can specify or identify the scanner which read the image data.

In the step S106, a list of selectable scanner profiles in the profile storage unit 32 of the network server 3 is displayed on the monitor of the network terminal 1, and the flow advances to a step S107.

In the step S107, the user selects one scanner profile from the displayed list, and the flow advances to a step S108.

In the step S108, it demands the network server 3 to download the scanner profile selected in the step S107 to the terminal side, and the flow advances to the step S109.

In the step S109, it demands the network server 3 to download the monitor profile of the monitor of the network terminal 1 to the terminal side, and the flow advances to a step S110.

In the step S110, CMM information of the header portion of the downloaded monitor profile (i.e., destination profile) is obtained or fetched, and the flow advances to a step S111.

In the step S111, it demands the network server 3 to download the CMM coincident with the CMM information obtained in the step S110, and the flow advances to a step S112.

In the step S112, the image data is obtained from the image file in the text, and the flow advances to a step S113.

In the step S113, the source profile obtained in the step S103 or S108 and the monitor profile obtained in the step S109 are set to the CMM, and the flow advances to a step S114.

In the step S114, the color matching process is performed on the image data obtained in the step S112, by using the CMM obtained in the step S113, and the flow advances to a step S115.

In the step S115, the image is displayed on the monitor of the network terminal 1 based on the data subjected to the color matching process in the step S114, and then the process terminates.

According to such process, it becomes possible to download the necessary profile and CMM to the network terminal, perform the color matching process on the image data in the text on the side of the network terminal 1, and display the processed image data on the monitor of the network terminal 1.

Figure 6:
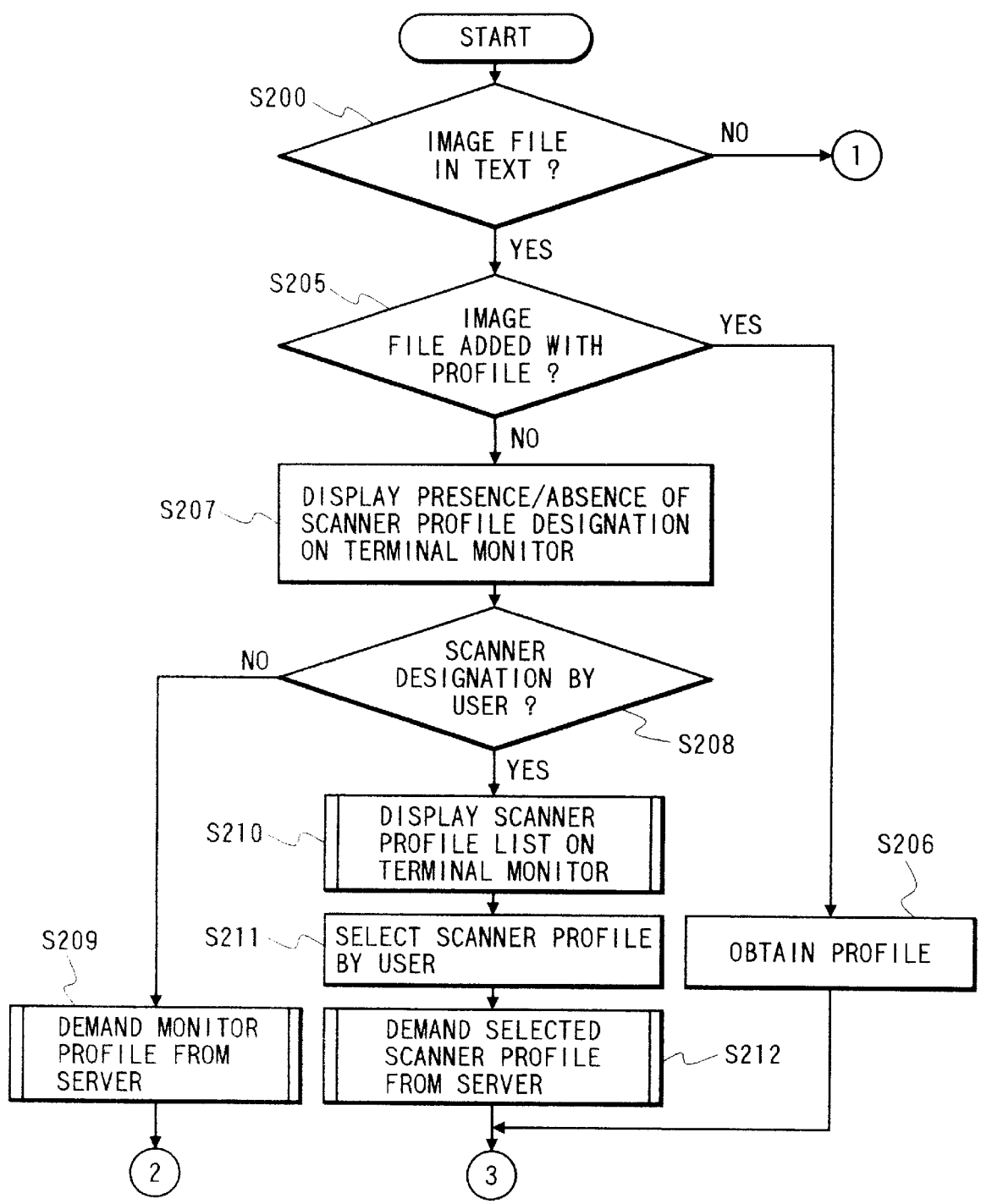
FIG. 6 is a flow chart showing a process wherein, in case of printing the text by using a network printer 4, the color matching process on the data in the text is performed by the network terminal 1 in accordance with a characteristic of the network printer 4, and the processed data is outputted to the network printer 4.
Figure 7:
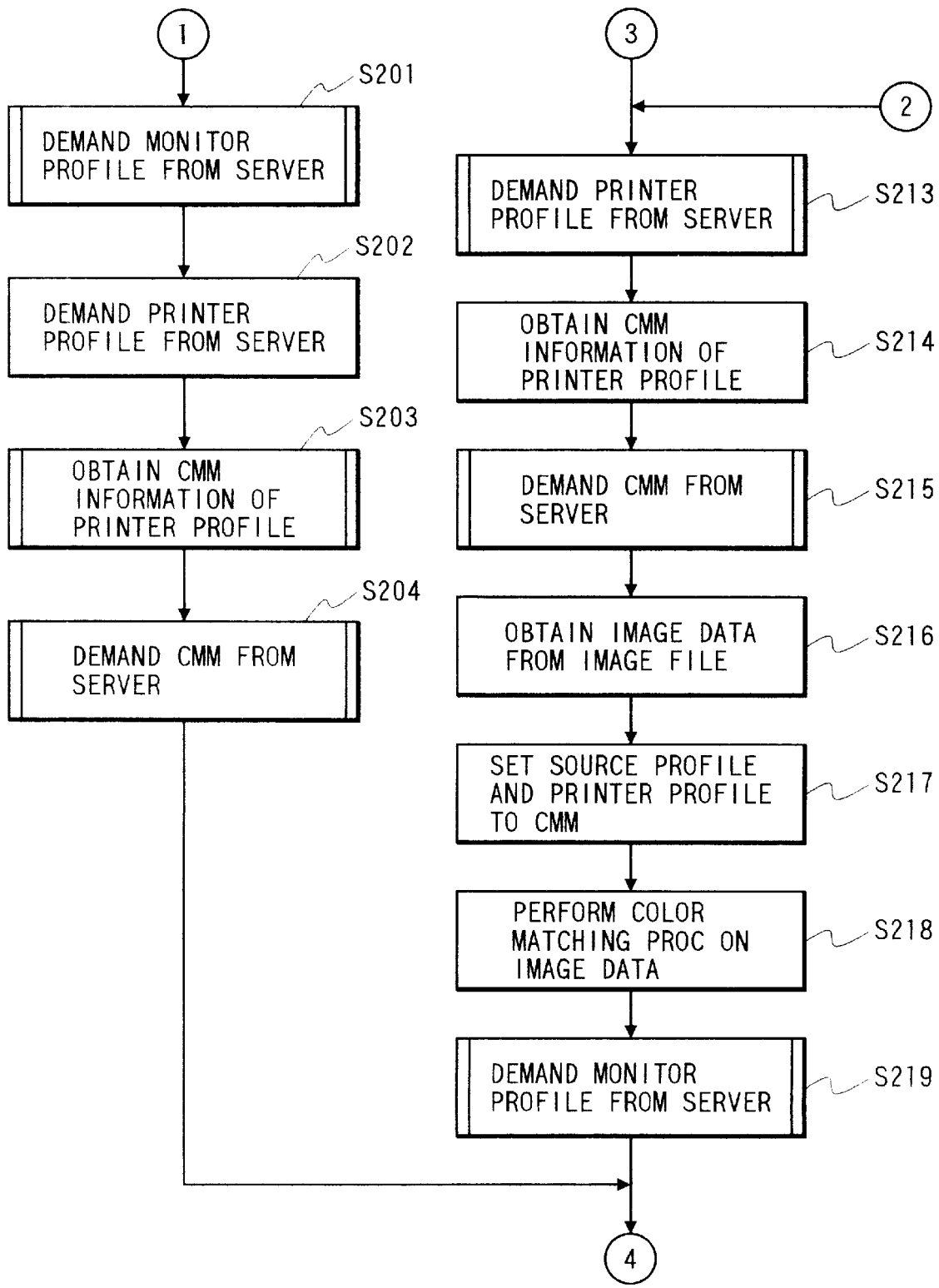
FIG. 7 is a flow chart showing the process wherein, in case of printing the text by using the network printer 4, the color matching process on the data in the text is performed by the network terminal 1 in accordance with the characteristic of the network printer 4, and the processed data is outputted to the network printer 4.
Figure 8:
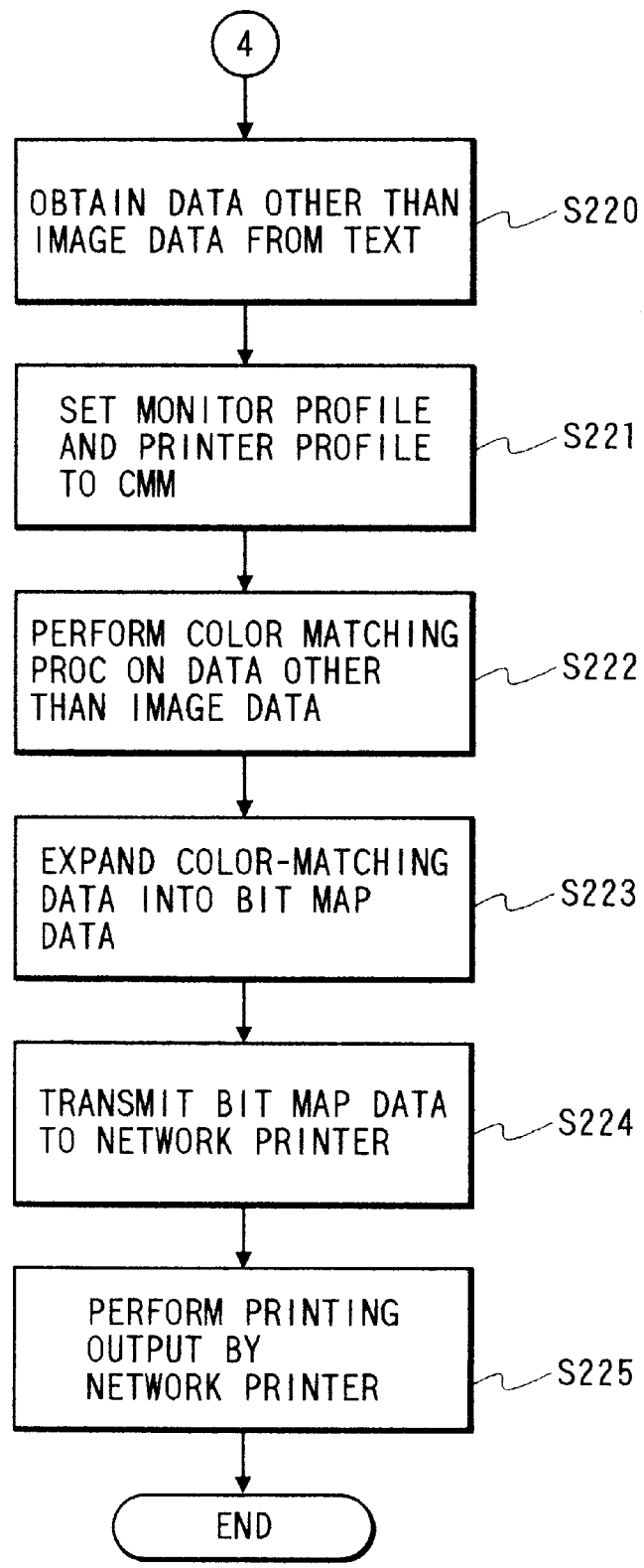
FIG. 8 is a flow chart showing the process wherein, in case of printing the text by using the network printer 4, the color matching process on the data in the text is performed by the network terminal 1 in accordance with the characteristic of the network printer 4, and the processed data is outputted to the network printer 4.

FIGS. 6 to 8 are flow charts showing a process wherein, in case of printing the text by using the network printer 4, the color matching process on the data in the text is performed by the network terminal 1 in accordance with the characteristic of the network printer 4 and then the processed data is outputted to the network printer 4.

In a step S200, it is checked whether or not the image file exists in the text to be printed.

If the image file does not exist, it can be considered that all the data in the text were formed or generated on the monitor, whereby the color matching process is performed between the monitor of the network terminal 1 and the network printer 4. That is, a color in a printed image is matched with a color in a monitored image.

Thus, the flow advances to a step S201 to demand the network server 3 to download the monitor profile of the monitor of the network terminal 1 to the terminal side, and the flow advances to a step S202.

In the step S202, it demands the network server 3 to download the printer profile of the network printer 4 to the terminal side, and the flow advances to a step S203.

In the step S203, the CMM information of the header portion of the downloaded printer profile is obtained, and the flow advances to a step S204.

In the step S204, it demands the network server 3 to download the CMM coincident with the CMM information obtained in the step S203, to the terminal side. Then, the flow advances to a step S220.

If the image file exists in the step S200, the flow advances to a step S205 to check whether or not the profile is being added to the image file.

In this case, if the profile is being added, the flow advances to a step S206 to obtain the device profile, and the flow advances to a step S213. This profile is the profile for the scanner, the monitor or the like, and is handled as the source profile.

If the profile is not being added in the step S205, the flow advances to a step S207 to display on a monitor a screen for urging the user to instruct whether or not he designates the scanner which read the image data, and the flow advances to a step S208.

In the step S208, it is checked a result of the user's instruction indicating whether or not the user designates the scanner.

If the user does not designate the scanner in the step S208, the flow advances to a step S209 to demand the network server 3 to download the monitor profile of the monitor of the network terminal 1 to the terminal side, and the flow advances to the step S213.

This is the case where the user can not specify the scanner which read the image data, and it is represented that the source device in the color matching on the text is the monitor of the network terminal 1.

On the other hand, if it is instructed to designate the scanner in the step S208, the flow advances to a step S210. This is the case where the user can specify the scanner which read the image data.

In the step S210, the list of the selectable scanner profiles in the profile storage unit 32 of the network server 3 is displayed on the monitor of the network terminal 1, and the flow advances to a step S211.

In the step S211, the user's instruction to select one scanner profile from the list is received, and the flow advances to a step S212.

In the step S212, it demands the network server 3 to download the scanner profile instructed in the step S211 to the terminal side, and the flow advances to the step S213.

In the step S213, it demands the network server 3 to download the printer profile of the network printer 4 to the terminal side, and the flow advances to a step S214.

In the step S214, the CMM information of the header portion of the downloaded printer profile is obtained, and the flow advances to a step S215.

In the step S215, it demands the network server 3 to download the CMM coincident with the CMM information obtained in the step S214, to the terminal side. Then, the flow advances to a step S216.

In the step S216, the image data is obtained from the image file in the text, and the flow advances to a step S217.

In the step S217, the source profile obtained in the step S206, S209 or S212 and the printer profile obtained in the step S213 are set to the CMM, and the flow advances to a step S218.

In the step S218, the color matching process is performed on the image data obtained in the step S216, by using the CMM in the step S217. Then, the flow advances to a step S219.

By such process, it becomes possible to download the necessary profile and CMM to the network terminal, and perform the color matching process on the image data in the text on the side of the network terminal.

Further, the flow advances to the step S219 to demand the network server 3 to download the monitor profile of the network terminal 1 to the terminal side, and then the flow advances to the step S220.

In the step S220, data (character, graphics and the like) other than the image in the text is obtained, and the flow advances to a step S221.

In the step S221, the monitor profile (source profile) downloaded in the step S201 or S209 and the printer profile downloaded in the step S203 or S205 are set to the CMM, and the flow advances to a step S222.

In the step S222, the color matching process is performed on the data other than the image obtained in the step S220, by using the CMM in the step S221. Then, the flow advances to a step S223.

By such process, it becomes possible to download the necessary profile and CMM to the network terminal, and perform the color matching process on the data other than the image and the image data in the text in accordance with each source device.

In the step S223, the data color matching processed in the steps S218 and S222 are expanded into the bit map data in the network server 3 such that the color-matched data can be outputted by the network printer 4. Then, the flow advances to a step S224.

In the step S224, the bit map data expanded in the step S223 is transmitted from the network terminal 1 to the network printer 4 through the network 2, and the flow advances to a step S225.

In the step S225, the bit map data transmitted in the step S224 is received and printed by the network printer 4, and then the process terminates.

As above, it becomes possible to download the necessary profile and CMM to the network terminal, independently perform the color matching process on the image data and the data other than the image in the text on the side of the network terminal 1, synthesize and expand the processed data into bit map form, transmit the obtained bit map data to the network printer 4, and then print the transmitted data by the network printer 4.

Figure 9:
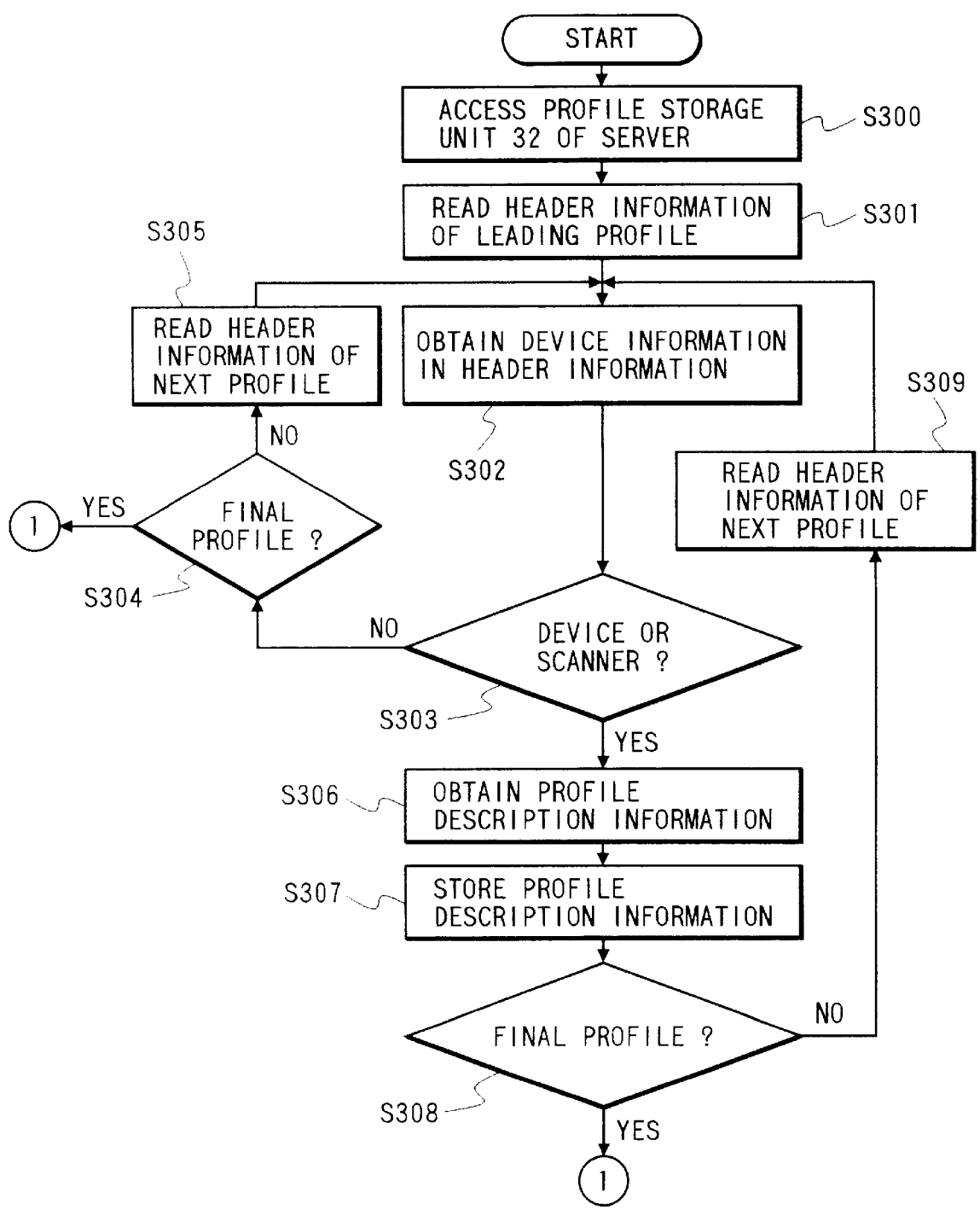
FIG. 9 is a flow chart showing detailed processes in a step S106 of FIG. 4 and a step S210 of FIG. 6.
Figure 10:
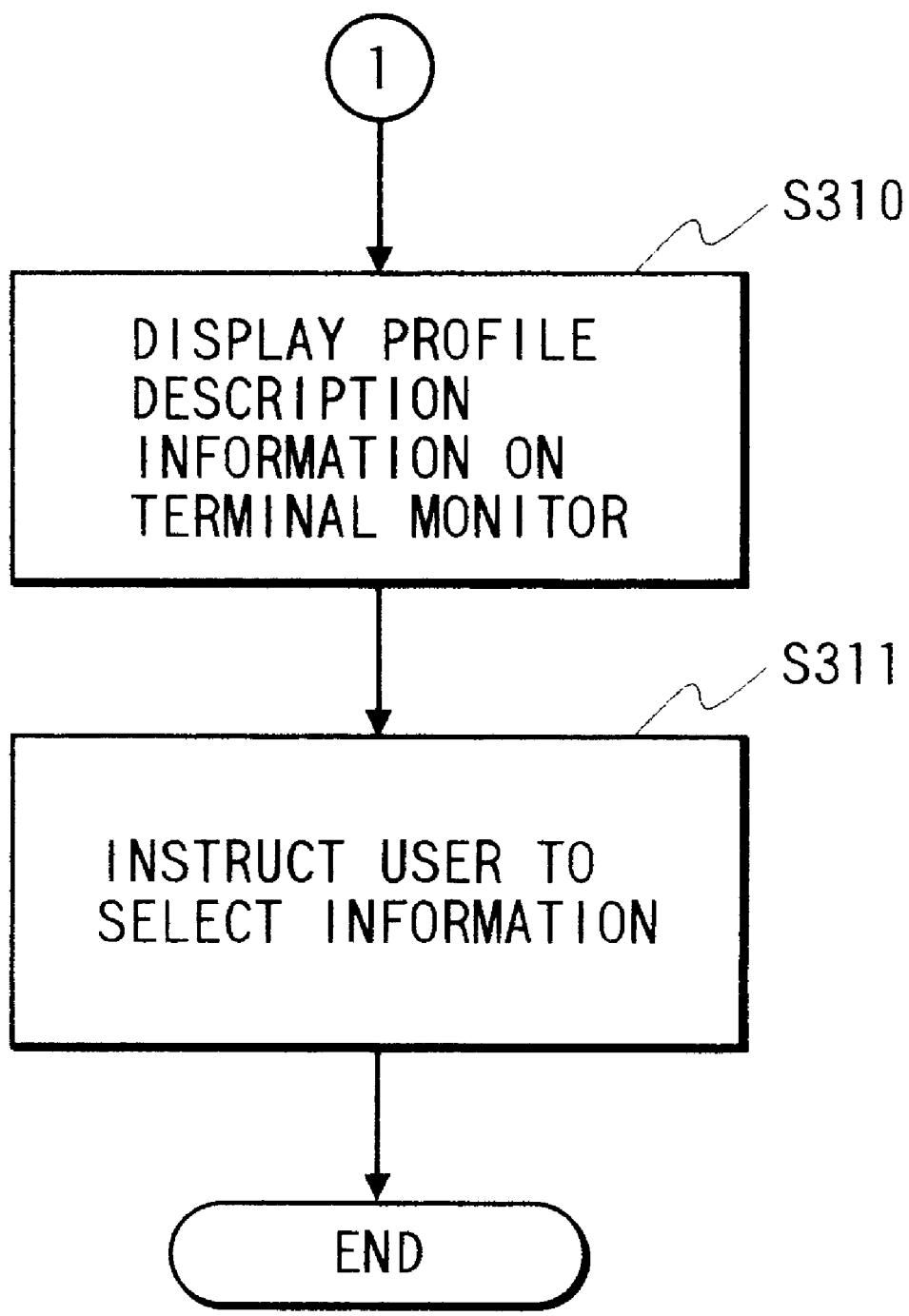
FIG. 10 is a flow chart showing the detailed processes in the step S106 of FIG. 4 and the step S210 of FIG. 6.

FIGS. 9 and 10 are flow charts showing in detail the processes in the steps S106 and S210 wherein the list of the selectable scanner profiles in the profile storage unit 32 of the network server 3 is displayed on the monitor of the network terminal 1.

In a step S300, the profile storage unit 32 of the network server 3 is accessed, and the flow advances to a step S301.

In the step S301, information of a header portion (i.e., header information) of the leading profile in the profile storage unit 32 is read, and the flow is advances to a step S302.

In the step S302, device information is obtained or fetched from the header information read in the step S301, and the flow advances to a step S303.

In the step S303, it is checked whether or not the device information represents the scanner. If the device information does not represent the scanner, the flow advances to a step S304 to check whether or not the profile from which the header information is currently read is final. If final, the flow advances to a step S310. On the other hand, if not final, the flow advances to a step S305 to read the header information of the next profile, and then the flow returns to the step S302.

As a result of the checking in the step S303, if it is found that the read profile represents the scanner, the flow advances to a step S306 to obtain the profile description information in the data storage portion of the profile. Then, the flow advances to a step S307.

In the step S307, the profile description information obtained in the step S306 is temporarily stored in the RAM or the like of the network terminal 1, and the flow advances to a step S308.

In the step S308, it is checked whether or not the profile from which the header information is currently read is final. If not final, the flow advances to a step S309 to read the header information of the next profile, and the flow returns to the step S302. On the other hand, if final, the flow advances to the step S310 to display the profile description information temporarily stored in the step S307 on the monitor as the list, and the flow advances to a step S311 to display on the monitor a screen for urging the user which information to select. Then, the process terminates.

As above, it becomes possible to display the list of the selectable scanner profiles in the profile storage unit 32 of the network server 3, on the monitor of the network terminal 1.

Figure 11:
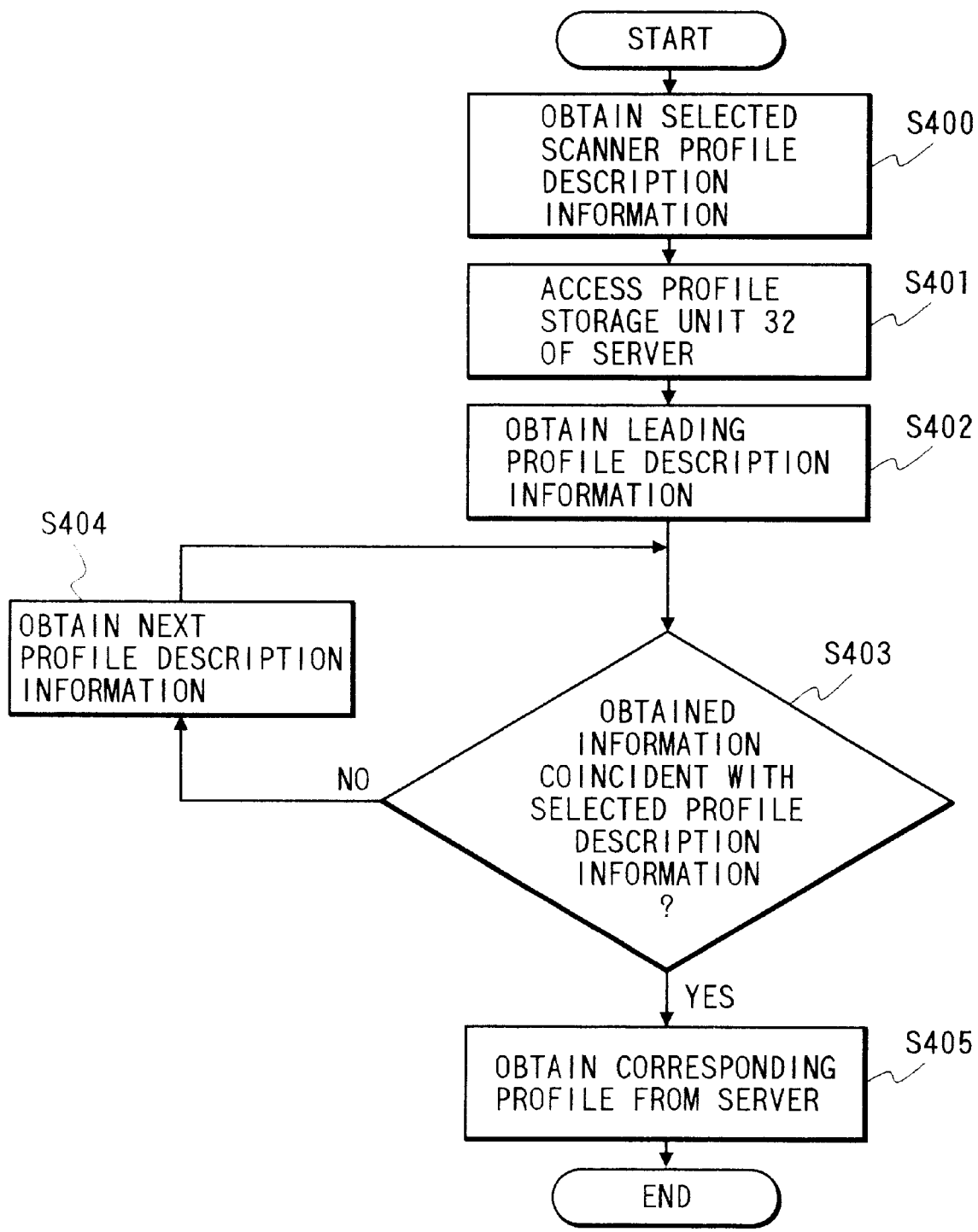
FIG. 11 is a flow chart showing detailed processes in a step S108 of FIG. 4 and a step S212 of FIG. 6.

FIG. 11 is a flow chart showing in detail the processes in the steps S108 and S212 to demand the network server 3 to download the scanner profile selected by the user, to the terminal side.

In a step S400, the profile description information of the data storage portion of the scanner profile selected in the step S107 is obtained, and the flow advances to a step S401.

In the step S401, the profile storage unit 32 of the network server 3 is accessed, and the flow advances to a step S402.

In the step S402, the profile description information of the data storage portion of the leading profile in the profile storage unit 32 is obtained, and the flow advances to a step S403.

In the step S403, it is checked whether or not the profile description information obtained in the step S402 is coincident with the profile description information obtained in the step S400. If not coincident, the flow advances to a step S404 to obtain the profile description information of the data storage portion of the next profile, and the flow returns to the step S403. On the other hand, if coincident in the step S403, the flow advances to a step S405 to obtain and download such the profile from the network server 3, and then the process terminates.

As above, it becomes possible to demand the network server 3 to download the scanner profile selected by the user, to the terminal side.

Figure 12:
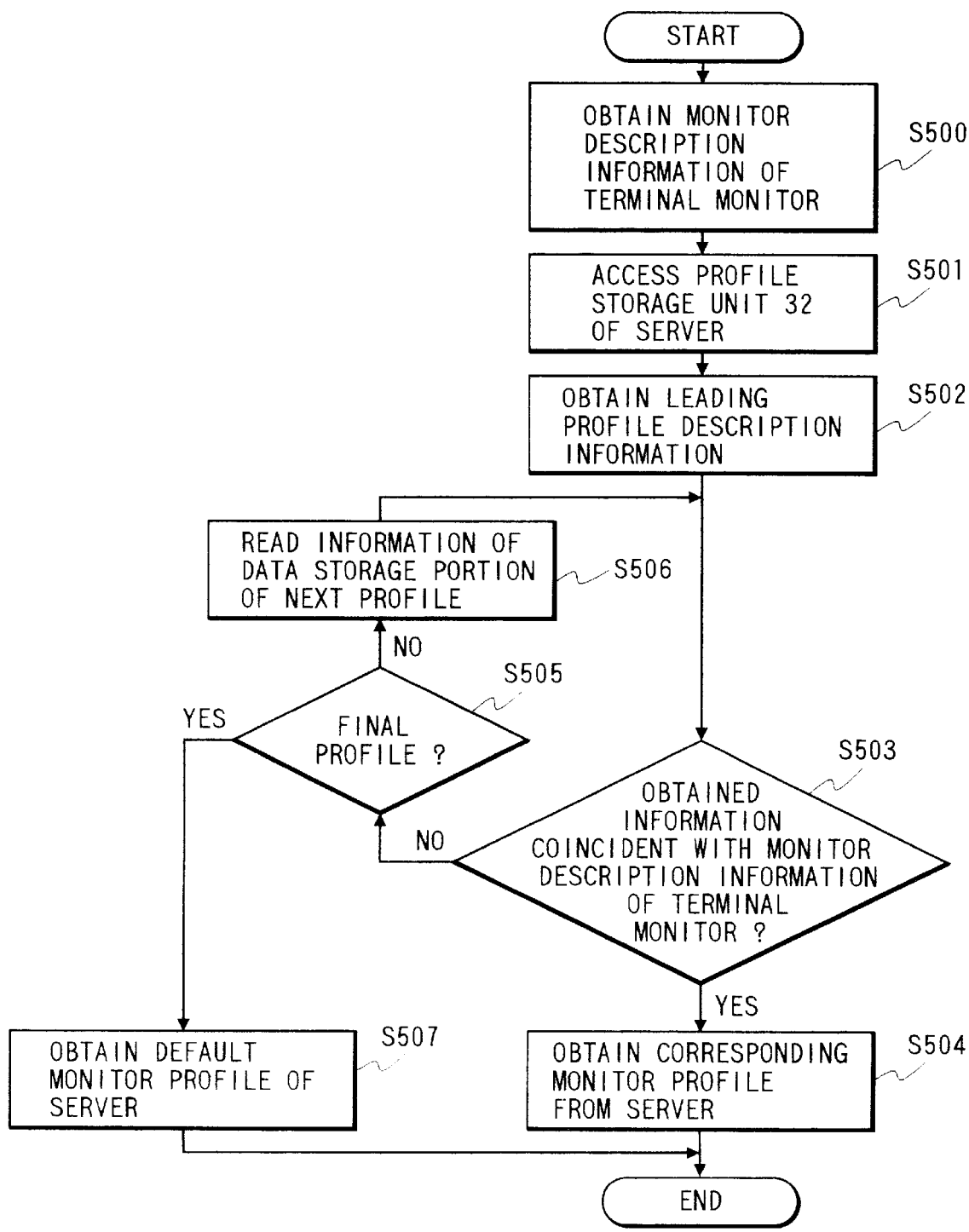
FIG. 12 is a flow chart showing detailed processes in a step S109 of FIG. 5, a step S201 of FIG. 7, a step S209 of FIG. 6 and a step S219 of FIG. 7.

FIG. 12 is a flow chart showing in detail the processes in the steps S109, S201, S209 and S219 to demand the network server 3 to download the monitor profile of the monitor of the network terminal 1 to the terminal side.

In a step S500, the monitor description information of the monitor of the network terminal 1 is obtained from the monitor description information storage unit 11, and the flow advances to a step S501.

In the step S501, the profile storage unit 32 of the network server 3 is accessed, the flow advances to a step S502.

In the step S502, the profile description information of the data storage portion of the leading profile in the profile storage unit 32 is obtained, and the flow advances to a step S503.

In the step S503, it is checked whether or not the profile description information obtained in the step S502 is coincident with the monitor description information obtained in the step S500. If not coincident, the flow advances to a step S505 to check whether or not the profile from which the profile description information is currently read is final.

If final, the flow advances to a step S507 to obtain and download a default monitor profile of the network server 3 stored in the profile storage unit 32, and then the process terminates. On the other hand, if not final, the flow advances to a step S506 to obtain the profile description information of the data storage portion of the next profile, and the flow returns to the step S503.

If coincident in the step S503, the flow advances to a step S504 to obtain and download such profile from the network server 3, and then the process terminates.

As above, it becomes possible to demand the network server 3 to download the monitor profile of the monitor of the network terminal 1 to the terminal side.

Figure 13:
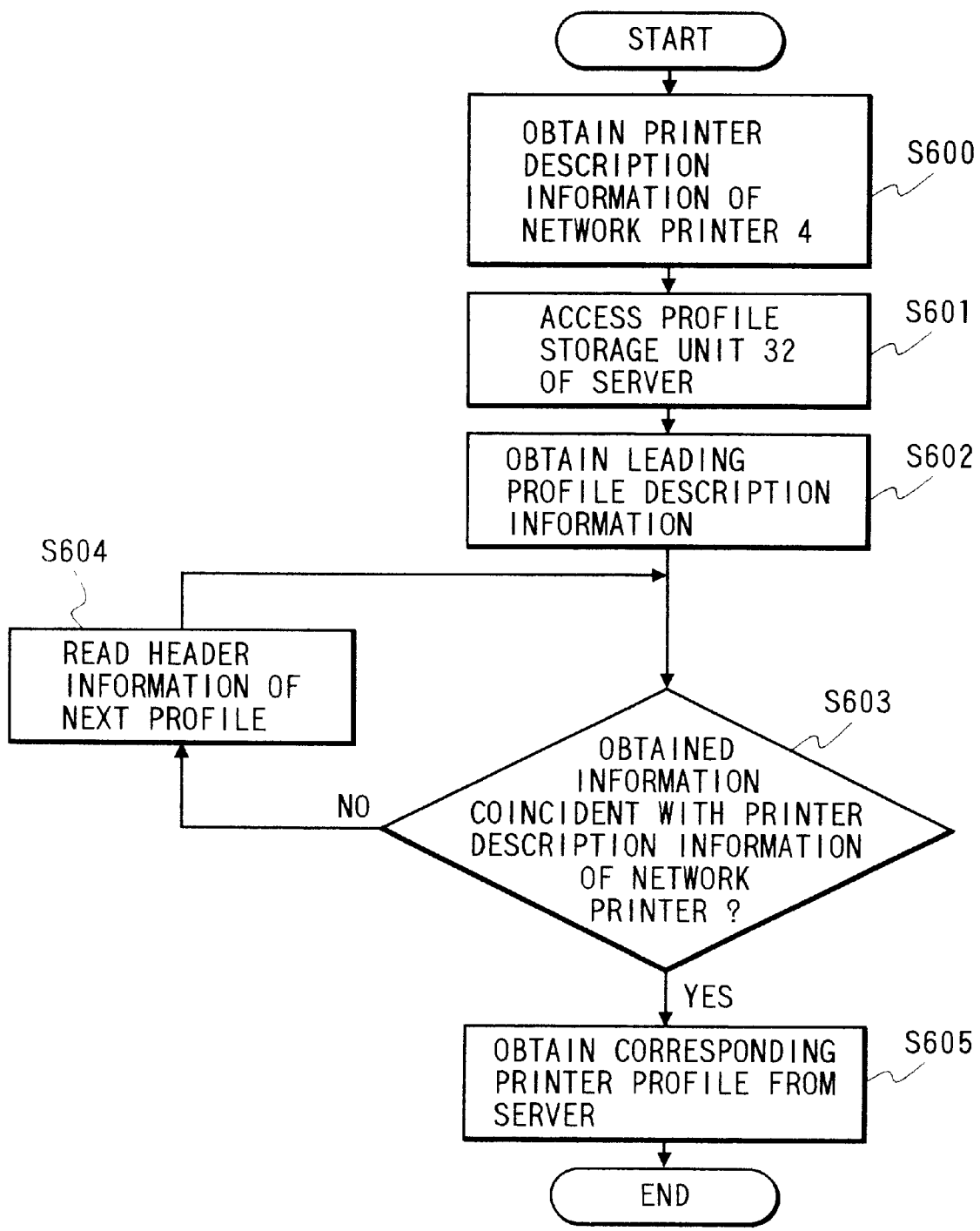
FIG. 13 is a flow chart showing detailed processes in steps S213 and S202 of FIG. 7.

FIG. 13 is a flow chart showing in detail the processes in the steps S213 and S202 to demand the network server 3 to download the printer profile of the network printer 4 to the terminal side.

In a step S600, the printer description information of the network printer 4 is obtained from the printer description information storage unit 12, and the flow advances to a step S601.

In the step S601, the profile storage unit 32 of the network server 3 is accessed, and the flow advances to a step S602.

In the step S602, the profile description information of the data storage portion of the leading profile in the profile storage unit 32 is obtained, and the flow advances to a step S603.

In the step S603, it is checked whether or not the profile description information obtained in the step S602 is coincident with the printer description information obtained in the step S600. If not coincident, the flow advances to a step S604 to obtain the profile description information of the data storage portion of the next profile, and the flow returns to the step S603. On the other hand, if coincident, the flow advances to a step S605 to obtain and download the profile from the network server 3, and then the process terminates.

As above, it becomes possible to demand the network server 3 to download the printer profile of the network printer 4 to the terminal side.

Figure 14:
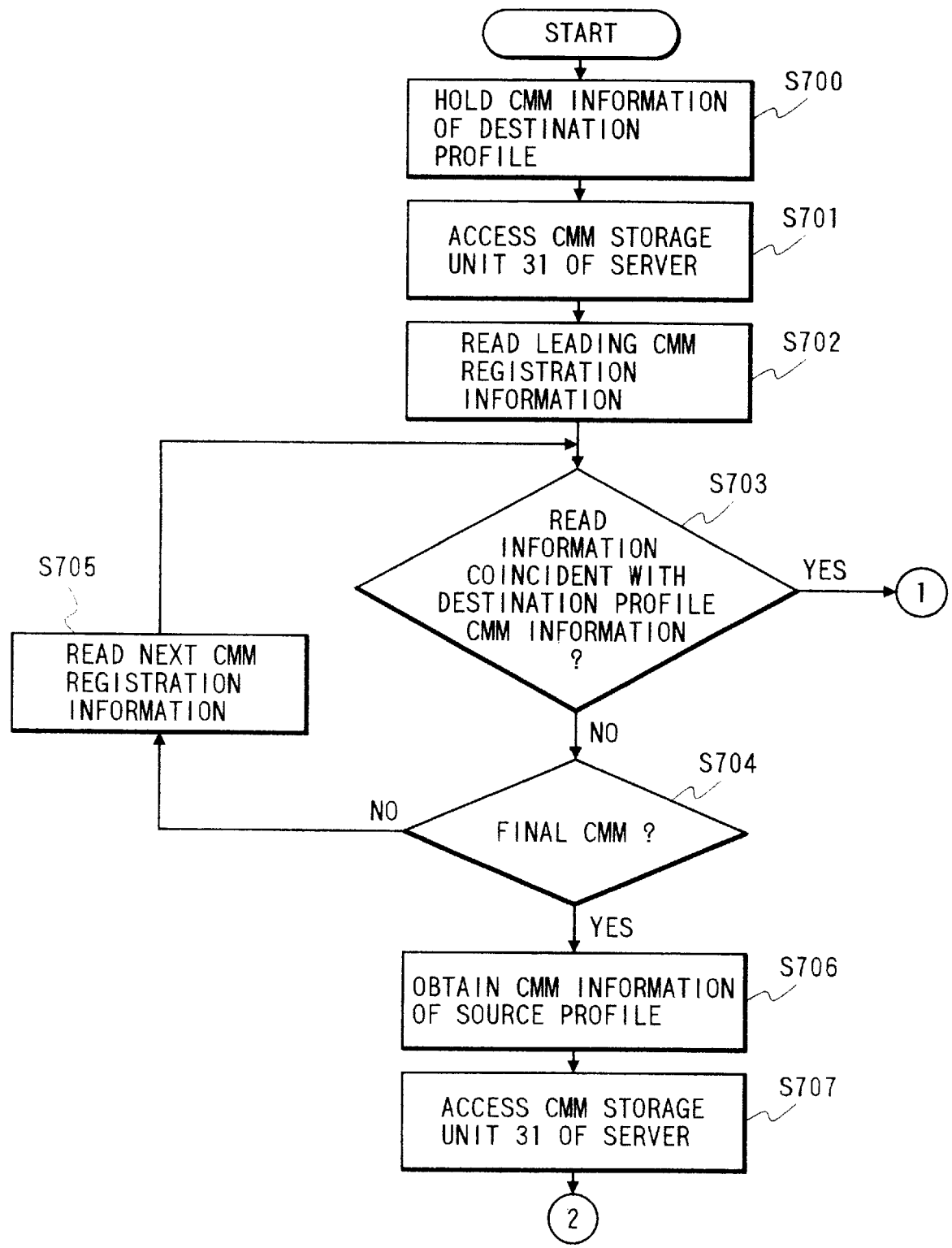
FIG. 14 is a flow chart showing detailed processes in a step S111 of FIG. 5, steps S204 and S215 of FIG. 7.
Figure 15:
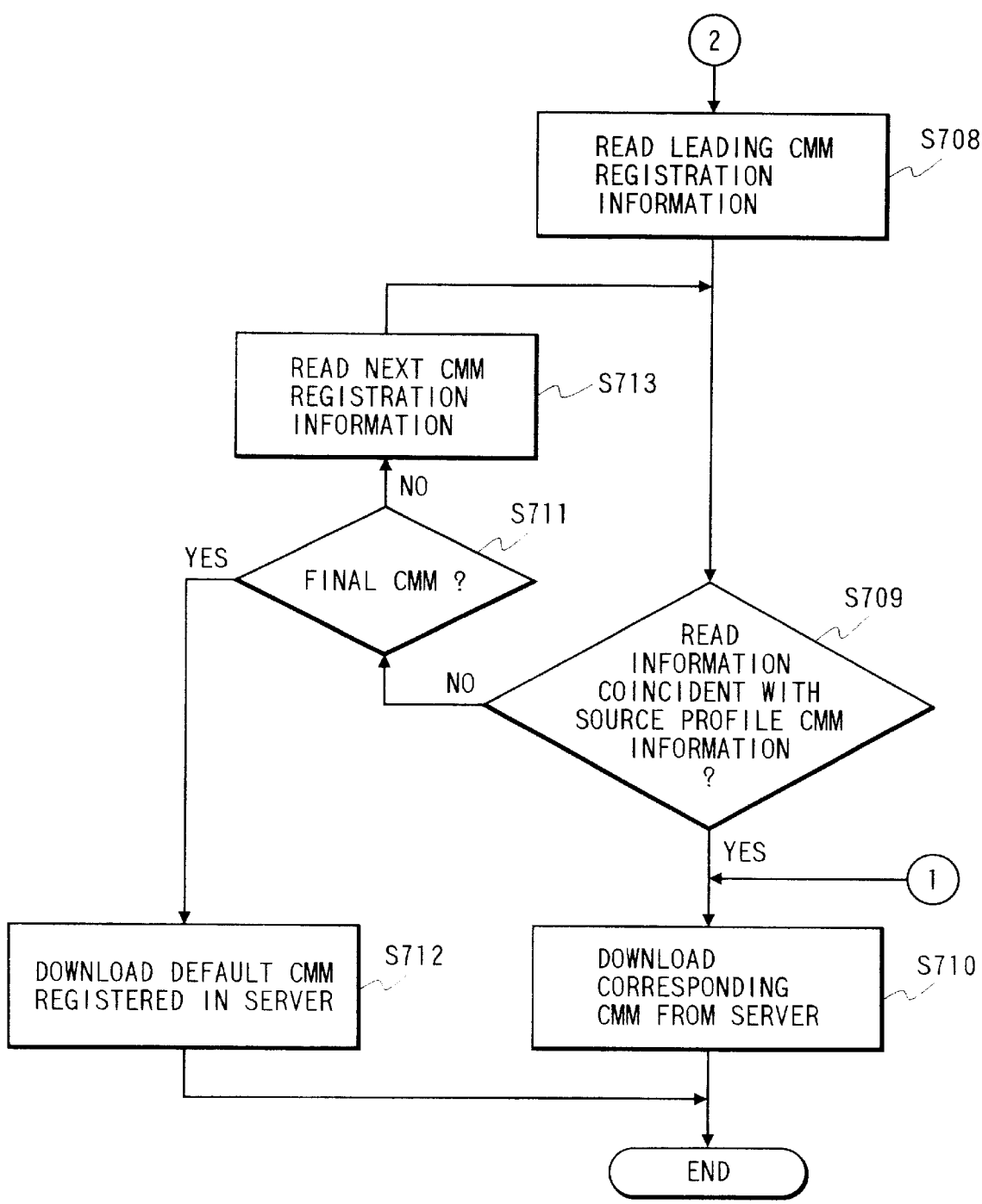
FIG. 15 is a flow chart showing the detailed processes in the step S111 of FIG. 5, the steps S204 and S215 of FIG. 7.

FIGS. 14 and 15 are flow charts showing in detail the processes in the steps S111, S204 and S215 to demand the network server 3 to download the CMM used for the color matching process to the terminal side.

In a step S700, the CMM information of the destination profile (monitor profile in case of performing monitor displaying, or printer profile in case of performing printing) is held, and the flow advances to a step S701.

In the step S701, the CMM storage unit 31 of the network server 3 is accessed, and the flow advances to a step S702.

In the step S702, the leading CMM registration information in the CMM storage unit 31 is obtained, and the flow advances to a step S703.

In the step S703, it is checked whether or not the CMM information obtained in the step S702 is coincident with the CMM information held in the step S700. If coincident, the flow advances to a step S710. On the other hand, if not coincident, the flow advances to a step S704 to check whether or not the CMM of which the registration information is currently read is final.

If not final, the flow advances to a step S705 to read the next CMM registration information, and the flow returns to the step S703. On the other hand, if final, the flow advances to a step S706 to obtain the CMM information of the source profile, and the flow advances to a step S707.

In the step S707, the CMM storage unit 31 of the network server 3 is accessed, and the flow advances to a step S708.

In the step S708, the CMM registration information of the leading profile in the CMM storage unit 31 is obtained, and the flow advances to a step S709.

In the step S709, it is checked whether or not the CMM information obtained in the step S708 is coincident with the CMM information of the source profile obtained in the step S706.

If not coincident, the flow advances to a step S711 to check whether or not the profile from which the CMM registration information is currently read is final. If final, the flow advances to a step S712 to obtain and download a default CMM of the network server 3 stored in the CMM storage unit 31, and then the process terminates. On the other hand, if not final, the flow advances to a step S713 to obtain the CMM registration information of the next profile, and the flow returns to the step S709.

If coincident in the step S709, the flow advances to the step S710 to obtain and download the CMM from the network server 3, and then the process terminates.

As above, it becomes possible to demand the network server 3 to download the CMM used for the color matching process to the terminal side.

FIG. 16 shows an example of a user interface used in the step S105 in FIG. 4 or the step S208 in FIG. 6. In the drawing, it has been selected the state that the user designates the scanner.

FIG. 17 shows an example of a user interface used in the step S106 in FIG. 4 or the step S210 in FIG. 6. In the drawing, a list of maker names and product (i.e., scanner) names is displayed.

Figure 20:
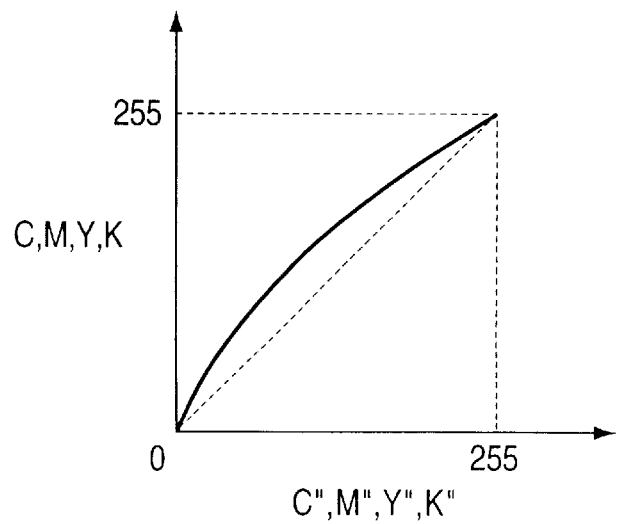
FIG. 20 is a view showing a correction to cancel the change in FIG. 19.

In FIG. 20, an arrow indicates the maker name "C company" and the product name "A-4015". Therefore, if the user depresses a selection button as is, the scanner A-4015 manufactured by the C company is selected.

Second Embodiment

In the first embodiment, the profile stored in the network server does not change according to changes in the characteristics of the device.

Therefore, there is the problem to be improved in the first embodiment, i.e., when the characteristic of the device changed due to a change in time elapse and a change in environment, an accurate color matching process becomes impossible.

In the second embodiment, as a modification of the first embodiment, a system having a calibration function for a profile will be explained.

FIGS. 18 to 21 are views for explaining calibration of a printer.

In the drawings, reference symbols C, M, Y and K denote densities of the printer, each of which has been normalized as eight-bit data.

Figure 18:
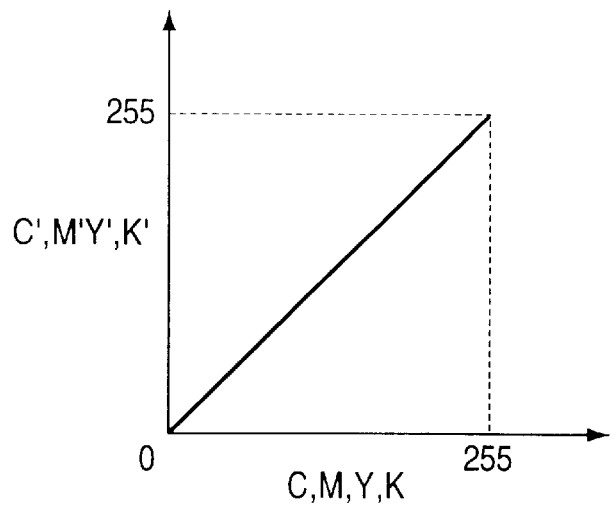
FIG. 18 is a view for explaining calibration of a printer.

In an initial state, since there is no change in density, the densities C, M, Y and K respectively have the same values of densities C', M', Y' and K' as shown in FIG. 18. However, since printing density changes due to influence of temperature, humidity, time-elapse change and the like, a case occurs where the densities C, M, Y and K do not have the same values as the densities C', M', Y' and K' as shown in FIG. 19.

Figure 19:
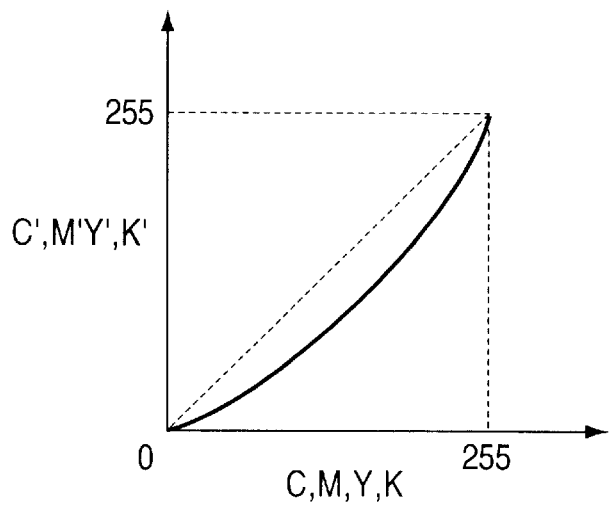
FIG. 19 is a view showing a change in printing density.

Therefore, in order to correct the state in FIG. 19, as shown in FIG. 20, it is necessary to set a correction process for cancelling the change in FIG. 19. Such process is generally called a calibration process.

In the present embodiment, the correction process can be performed by converting densities C", M", Y" and K" into the densities C, M, Y and K before inputting the densities C, M, Y and K in FIG. 19.

Figure 21:
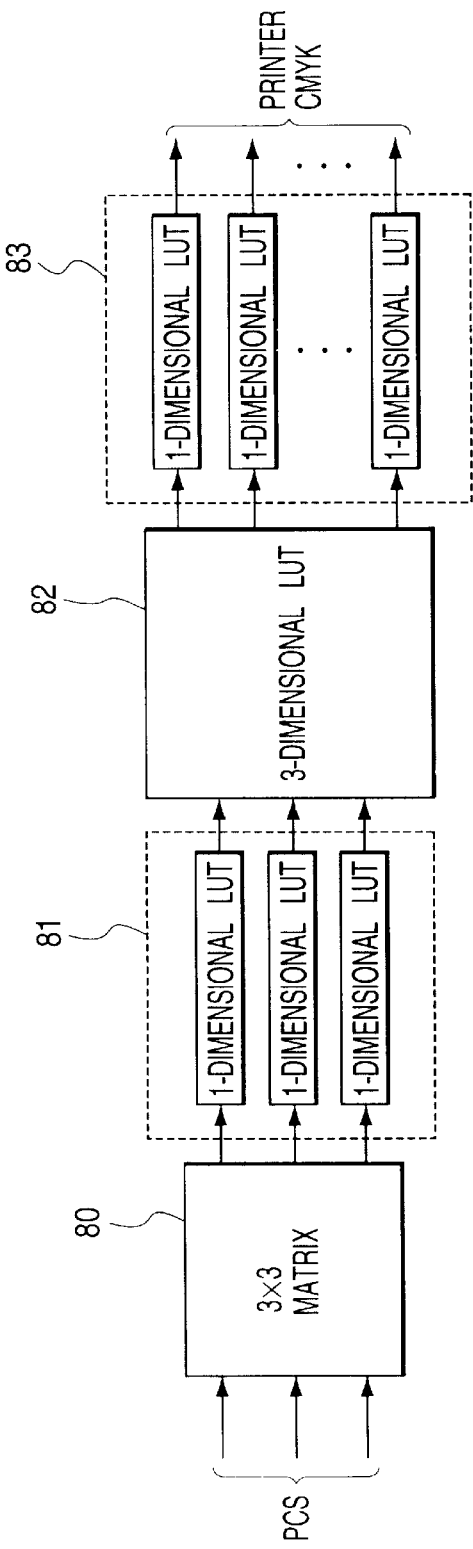
FIG. 21 is a view for explaining data which is stored in a data storage portion of a printer profile and used for color matching.

FIG. 21 is a view for explaining data which is stored in a data storage portion of the printer profile and used for the color matching. This data is based on a profile format standard of the ICC (International Color Consortium). That is, in case of converting a PCS (profile connection space: CIE XYZ or CIE Lab) which is a color space not depending on a device into a printer color space (CMYK in this case), the data used for the conversion sequentially performed in processes 80 to 83 is stored in the printer profile. In the drawing, the reference numeral 80 denotes the matrix calculation of three rows and three columns, 81 and 83 denote the processes through one-dimensional LUTs (look-up table), and 82 denotes the process through a three-dimensional LUT.

Figure 22:
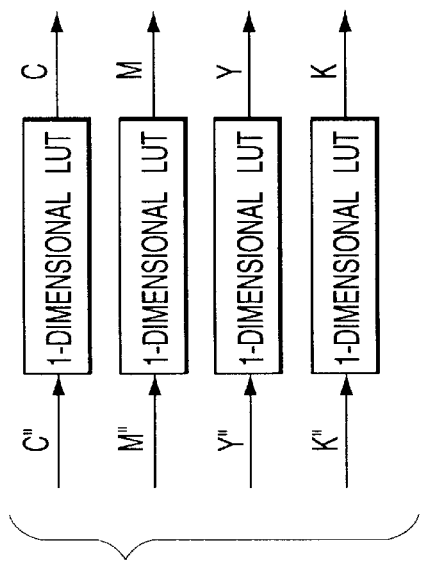
FIG. 22 is a view showing an example of a process 83 in FIG. 21.

FIG. 22 is a view showing a case where the input and output data of the process 83 in FIG. 21 are C, M, Y and K data (i.e., densities). By inputting the correction data for calibration in this process, the correction process shown in FIG. 20 is performed.

As above, the calibration process is performed in the color matching, by using a part of the data in the printer profile.

Figure 23:
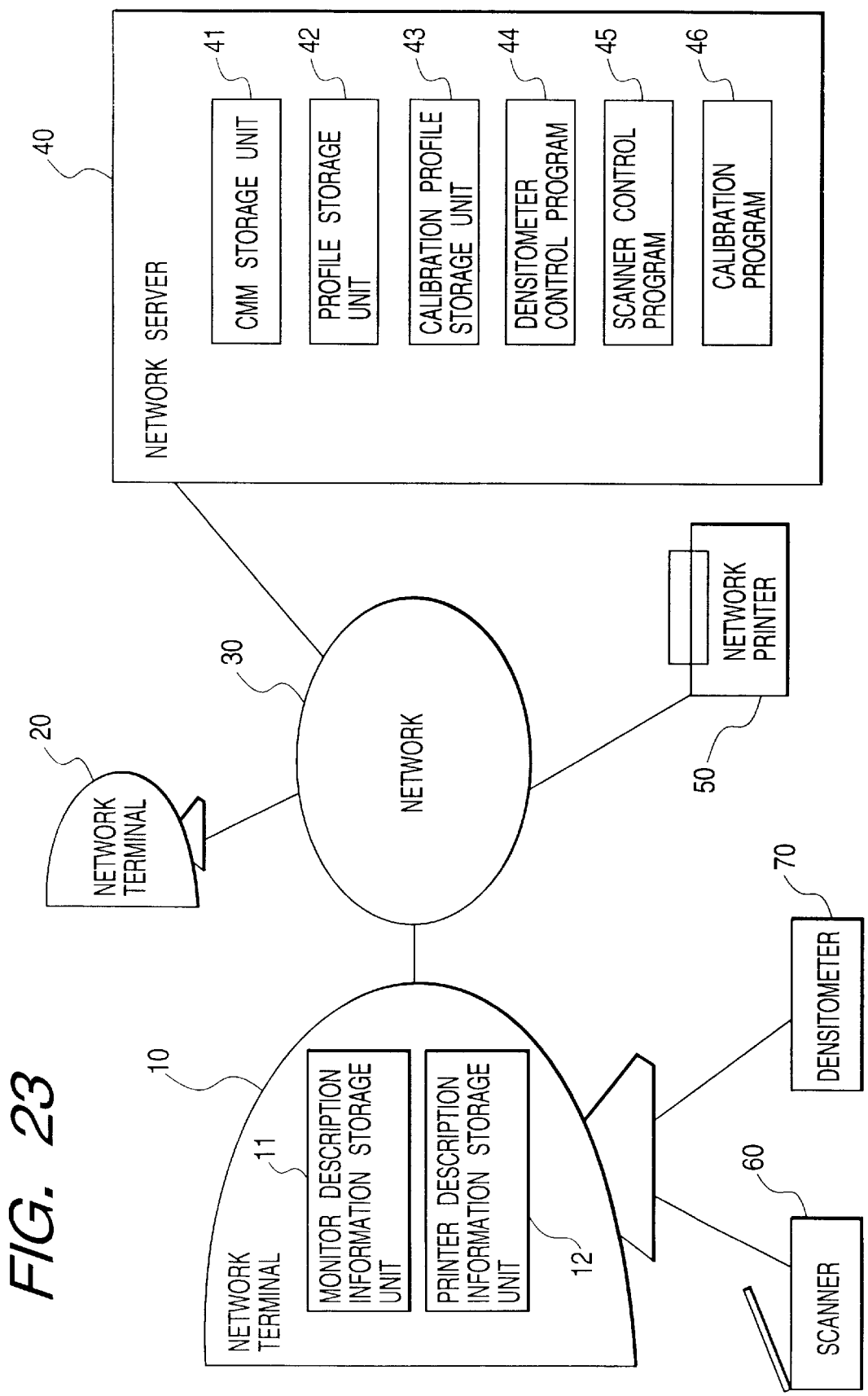
FIG. 23 is a view showing the structure of a network system according to a second embodiment.

FIG. 23 is a view showing the structure of a network system according to the second embodiment.

As shown in FIG. 23, the network system according to the present embodiment is composed of network terminals 10 and 20, a network server 40, a network printer 50, a scanner 60, a densitometer 70, and a network 30 to which the network terminals 10 and 20, the network server 40 and the network printer 50 are connected.

The network terminal 10 has a CPU, a VRAM and the like necessary for monitor displaying and image processing, and a communication function necessary for communication in the network. Further, the network terminal 10 has a monitor description information storage unit 11 for storing monitor description information to discriminate a monitor and a printer description information storage unit 12 for storing printer description information to discriminate the network printer 50.

The network server 40 has a CPU, a RAM, a hard disk and the like necessary for image processing and printing processing, and a communication function necessary for communication in the network. Further, the network server 40 has a CMM storage unit 41 in which n (n is constant) CMMs have been registered, a profile storage unit 42 in which m (m is constant) device profiles (monitor, scanner and printer) have been stored, a calibration profile storage unit 43 in which the printer profile containing therein calibration data which has been stored, a densitometer control program 44 which has a function for controlling the densitometer to measure density of color patch output and obtain the measured data, a scanner control program 45 which has a function for controlling the scanner to read the color patch output and obtaining the read data, and a calibration program 46 which has a function for generating the calibration data based on the data obtained by the densitometer control program 44 and the scanner control program 45.

The scanner 60 and the densitometer 70 are connected to the network terminal 10. Each CMM registered or stored in the CMM storage unit 41 has registration information (e.g., four-byte English numerals: UCCM) for discrimination.

Figure 24:
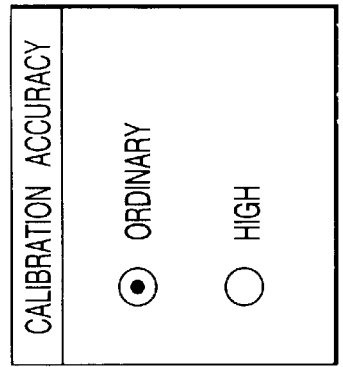
FIG. 24 is a view showing an example of a user interface (i.e., dialog) to cause a user to select accuracy of calibration.

FIG. 24 shows a user interface (dialog) which is used in case of causing a user to select calibration accuracy. In this case, if the user wishes the accuracy higher than ordinary accuracy, he may select "high".

Figure 25:
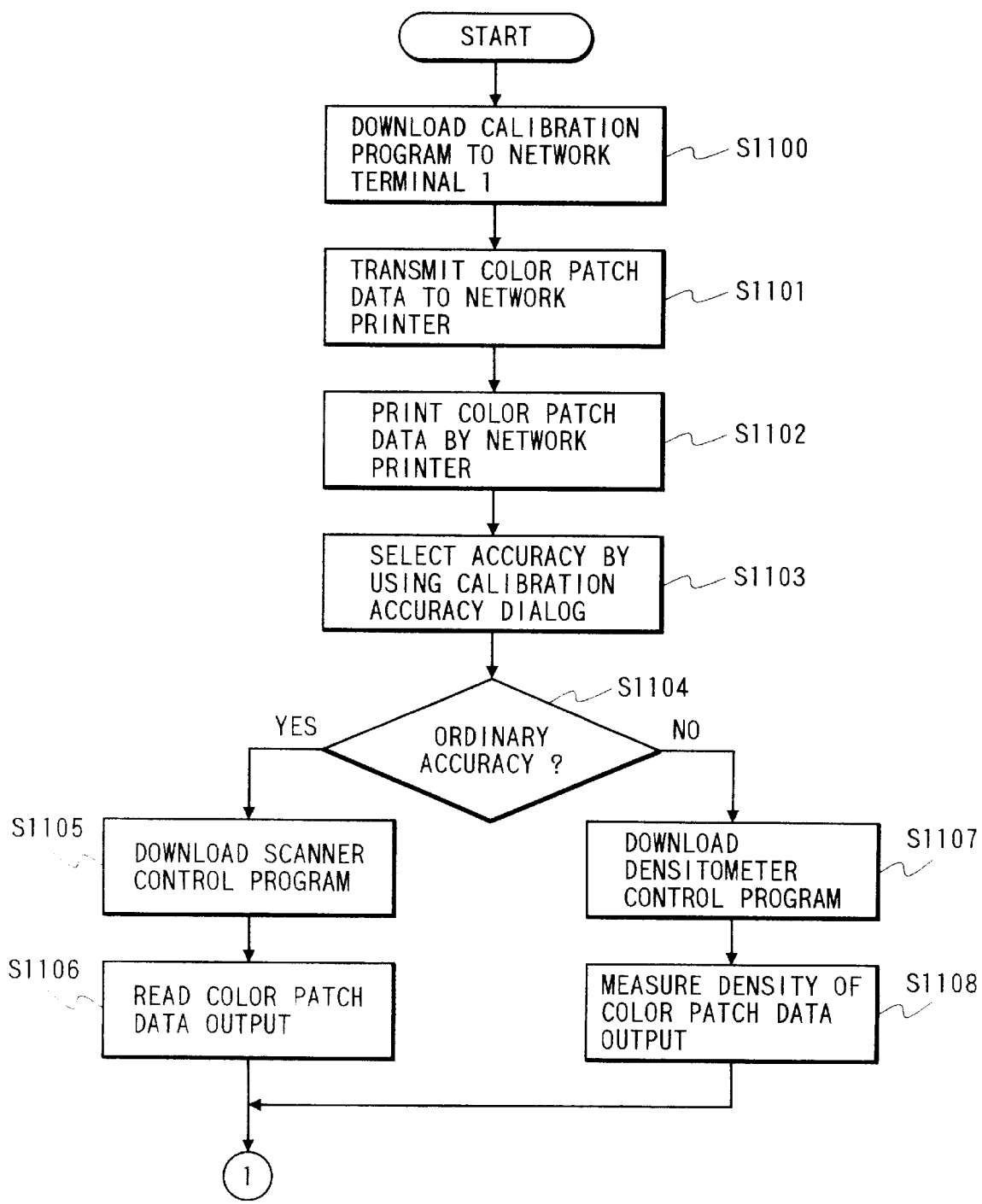
FIG. 25 is a flow chart showing a process wherein calibration data of a network printer 50 is generated by a network terminal 10 and then the generated data is stored in a printer profile to form and store a calibration profile.
Figure 26:
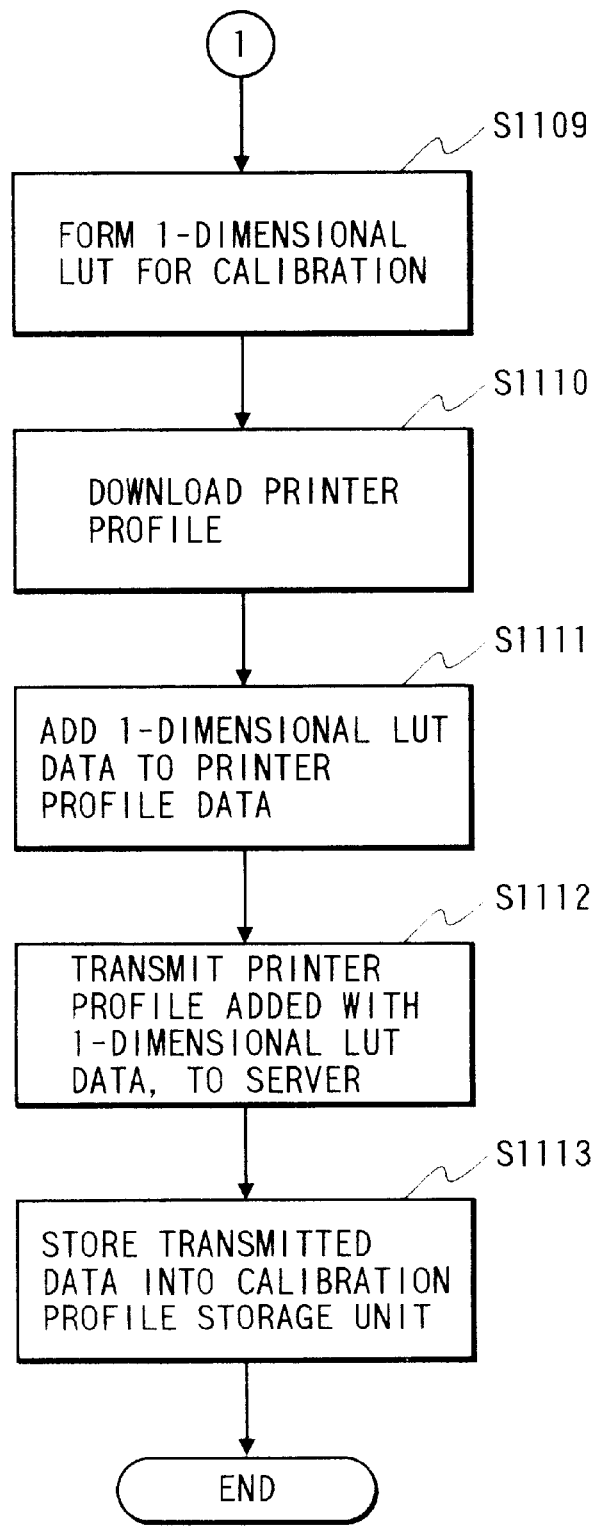
FIG. 26 is a flow chart showing the process wherein the calibration data of the network printer 50 is generated by the network terminal 10 and then the generated data is stored in the printer profile to form and store the calibration profile.

FIGS. 25 and 26 are flow charts showing a process in the network terminal 10, wherein the calibration data of the network printer 50 is generated, the calibration profile is formed by storing the generated data in the printer profile, and the formed profile is stored independently of the original printer profile corresponding to a kind of device stored in the profile storage unit.

In a step S1100, the calibration program 46 in the server 40 is downloaded to the network terminal 10, and the flow advances to a step S1101.

In the step S1101, a color patch data for generating the calibration data is transmitted from the network terminal 10 to the network printer 50, and the flow advances to a step S1102.

In the step S1102, the color patch data is printed by the network printer 50, and the flow advances to a step S1103.

In the step S1103, the calibration program 46 is initiated, the dialog for the selection of calibration accuracy shown in FIG. 24 is displayed, and the user selects the accuracy. Then, the flow advances to a step S1104.

In the step S1104, if the user selects the ordinary accuracy, the flow advances to a step S1105 to download the scanner control program in the server 4G to the network terminal 10. Then, the flow advances to a step S1106.

In the step S1106, the color patch data output printed in the step S1102 is read by the scanner 60, and the flow advances to a step S1109.

On the other hand, in the step S1104, if the user selects the high accuracy, the flow advances to a step S1107 to download the densitometer control program 44 in the server 40 to the network terminal 10, and then the flow advances to a step S1108.

In the step S1108, the color patch data output printed in the step S1102 is read by the densitometer 70, and the flow advances to the step S1109.

In the step S1109, based on the data obtained in the step S1106 or S1108, the one-dimensional LUT data shown in FIG. 22 is generated according to the calibration program 46, and the flow advances to a step S1110.

In the step S1110, the printer profile of the network printer 50 is downloaded from the profile storage unit 42 in the server 40 to the network terminal 10, and the flow advances to a step S1111.

In the step S1111, the one-dimensional LUT data generated in the step S1109 is stored in the printer profile, and the flow advances to a step S1112.

In the step S1112, the printer profile in which the one-dimensional LUT data has been additionally stored is transmitted to the server 40, and the flow advances to a step S1113.

In the step S1113, the transmitted printer profile is stored in the calibration profile storage unit 43 of the server 40 as the calibration profile, and then the process terminates.

As above, it becomes possible to download the necessary program or the like from the server, generate the calibration data at the network terminal 10, and add the generated data to the printer profile.

Further, in the above calibration process, since the calibration profile is stored independently of the original printer profile, the original printer profile is never changed. Therefore, even if the same-type printers are connected to the network, the color matching process can be accurately performed without any influence of calibration by the other printer.

Figure 27:
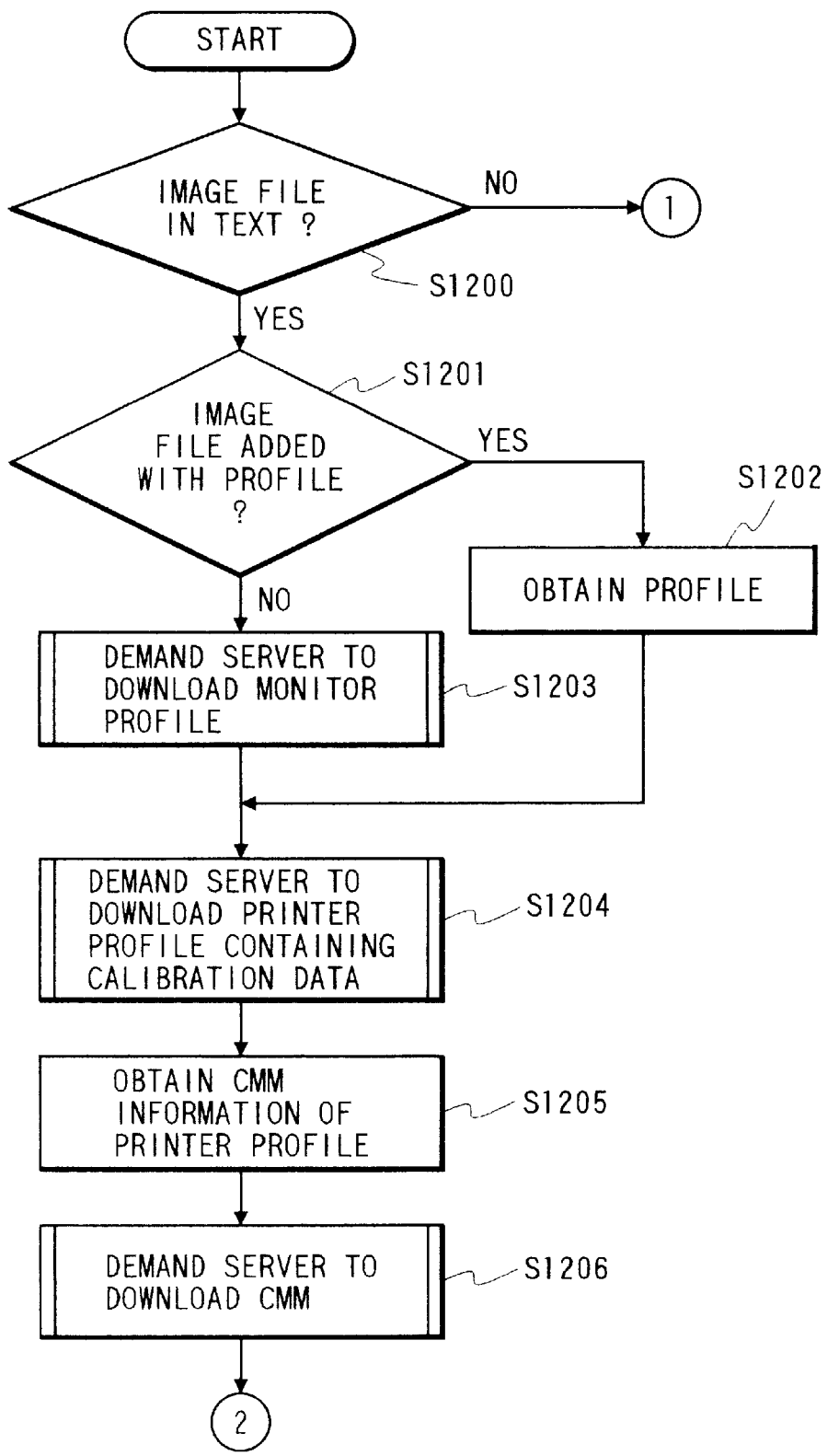
FIG. 27 is a flow chart showing a process wherein, in case of printing a text by using the network printer 50, a color matching process on data in the text is performed by the network terminal 10 by using the formed calibration profile and then the processed data is outputted to the network printer 50.
Figure 28:
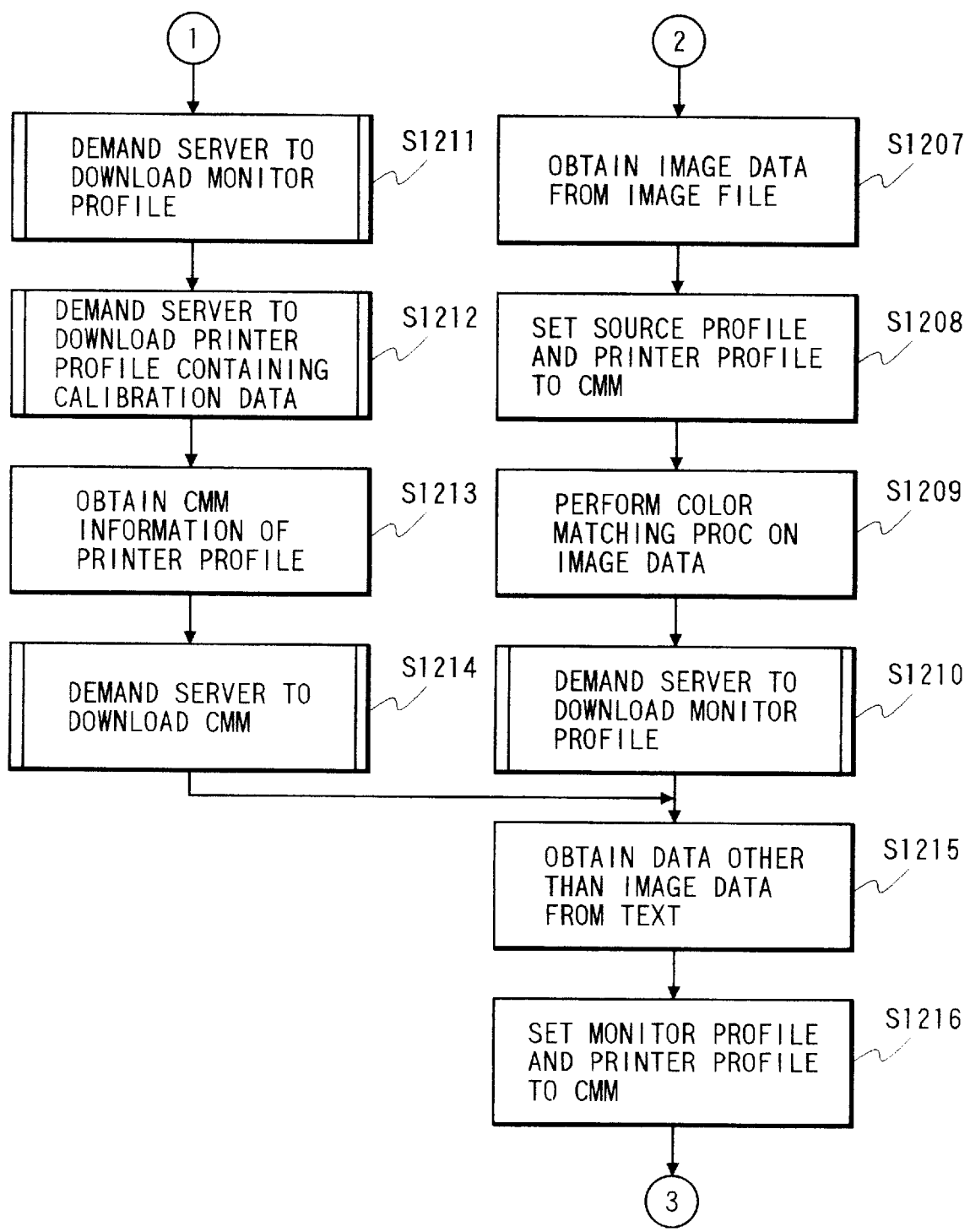
FIG. 28 is a flow chart showing the process wherein, in case of printing the text by using the network printer 50, the color matching process on the data in the text is performed by the network terminal 10 by using the formed calibration profile and then the processed data is outputted to the network printer 50.
Figure 29:
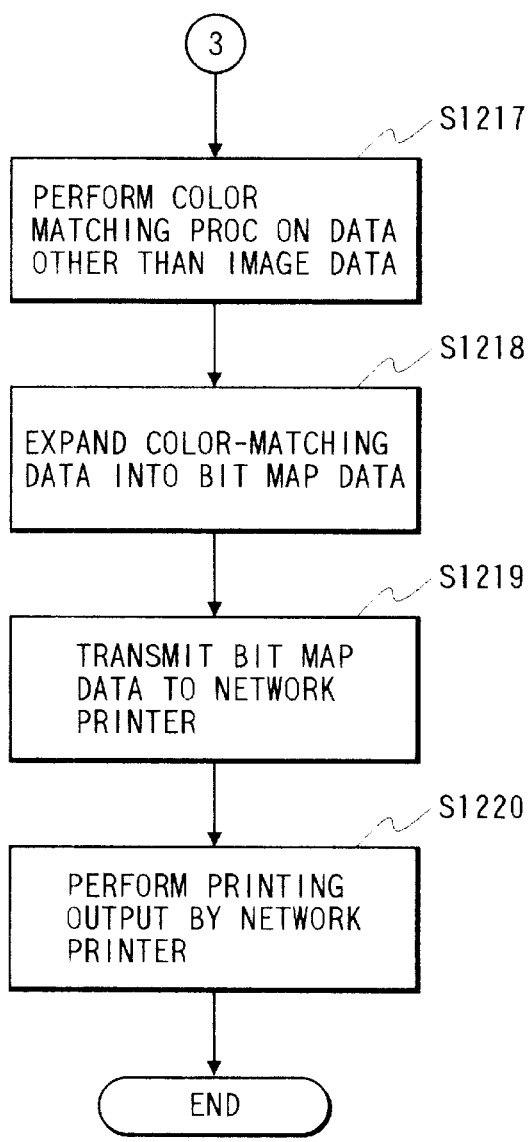
FIG. 29 is a flow chart showing the process wherein, in case of printing the text by using the network printer 50, the color matching process on the data in the text is performed by the network terminal 10 by using the formed calibration profile and then the processed data is outputted to the network printer 50.

FIGS. 27 to 29 are flow charts showing a process wherein, in case of printing the text by using the network printer 50, the color matching process on the data in the text is performed by the network terminal 10 with use of the calibration profile formed in FIGS. 25 and 26, and then the processed data is outputted to the network printer 50.

In a step S1200, it is checked whether or not the image file exists in the text to be printed.

If the image file does not exist, it can be considered that all the data in the text were generated or formed on the monitor. Therefore, the color matching process between the monitor of the network terminal 10 and the network printer 50 is performed.

In a step S1211, it demands the network server 40 to download the monitor profile of the monitor of the network terminal 10 to the terminal side, and the flow advances to a step S1212.

In the step S1212, it demands the network server 40 to download the printer profile in which the calibration data of the network printer 50 has been stored, from the calibration profile storage unit 43 to the terminal side, and the flow advances to a step S1213.

In the step S1213, the CMM information of the header portion of the downloaded printer profile is obtained, and the flow advances to a step S1214.

In the step S1214, it demands the network server 40 to download the CMM coincident with the CMM information obtained in the step S1213 to the terminal side, and the flow advances to a step S1215.

If the image file exists in the step S1200, the flow advances to a step S1201 to check whether or not the profile is added to the above image file.

If the profile is added, the flow advances to a step S1202 to obtain the device profile, and then the flow advances to a step S1204.

Such profile is the profile for the scanner, the monitor or the like, and thus managed as the source profile.

If the profile is not added in the step S1201, the flow advances to a step S1203 to demand the network server 40 to download the monitor profile of the monitor of the network terminal 10 to the terminal side, and then the flow advances to the step S1204.

In the step S1204, it demands the network server 40 to download the printer profile of the network printer 50 in which the calibration data has been stored, from the calibration profile storage unit 43 to the terminal side. Then, the flow advances to a step S1205.

In the step S1205, the CMM information of the header portion of the downloaded printer profile is obtained, and the flow advances to a step S1206.

In the step S1206, it demands the network server 40 to download the CMM coincident with the CMM information obtained in the step S1205, from the CMM storage unit 41 to the terminal side. Then, the flow advances to a step S1207.

In the step S1207, the image data is obtained from the image file in the text, and the flow advances to a step S1208.

In the step S1208, the source profile obtained in the step S1202 or S1203 and the printer profile obtained in the step S1204 are set to the CMM, and the flow advances to a step S1209.

In the step S1209, the color matching process on the image data obtained in the step S1207 is performed by using the CMM in the step S1208.

By such process up to this time, as can be understood, it becomes possible to download the necessary source profile, the printer profile in which the calibration data has been stored, and the CMM, to the network terminal, and then perform the color matching process on the image data in the text on the side of the network terminal.

Further, the flow advances to a step S1210 to demand the network server 40 to download the monitor profile of the monitor in the network terminal 10 to the terminal side. Then, the flow advances to the step S1215.

In the step S1215, the data (character, graphics or the like) other than the image in the text is obtained, and the flow advances to a step S1216.

In the step S1216, the monitor profile (i.e., source profile) downloaded in the step S1210 or S1211 and the printer profile downloaded in the step S1204 or S1212 are set to the CMM, and the flow advances to a step S1217.

In the step S1217, the color matching process on the data other than the image obtained in the step S1215 is performed by using the CMM in the step S1216, and the flow advances to a step S1218.

By such process up to this time, as can be understood, it becomes possible to download the necessary source profile, the printer profile containing the calibration data, and the CMM to the network terminal, and then perform the color matching process on the data other than the image in the text on the side of the network terminal.

In the step S1218, the data subjected to the color matching in the steps S1209 and S1217 are expanded into the bit map data in the network terminal 10 such that the expanded data can be outputted by the network printer 50, and the flow advances to a step S1219.

In the step S1219, the bit map data expanded in the step S1218 is transmitted from the network terminal 10 to the network printer 50 through the network 30, and the flow advances to a step S1220.

In the step S1220, the bit map data transmitted in the step S1219 is received and printed by the network printer 50, and then the process terminates.

As above, it becomes possible to download the necessary source profile, the printer profile containing the calibration data, and the CMM, to the network terminal, perform the color matching process (including calibration process) on the image data in the text and the data other than the image on the side of the network terminal 10, and then print the processed data by the network printer 50.

Figure 30:
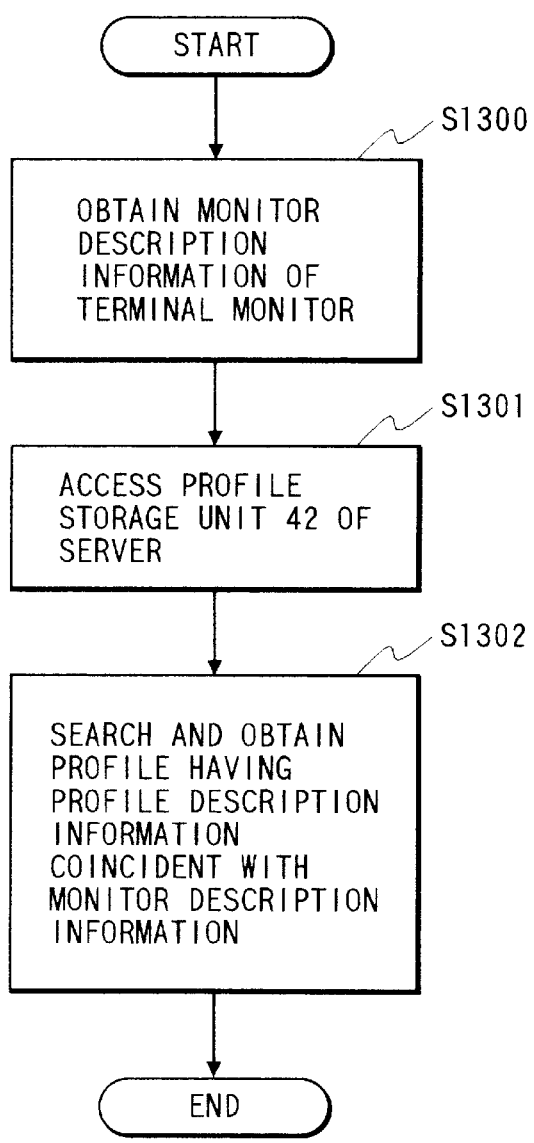
FIG. 30 is a flow chart showing a detailed process for demanding a network server 40 to download a monitor profile of a monitor of the network terminal 10 to a terminal side.

FIG. 30 is a flow chart showing in detail the processes in the steps S1203, S1210 and S1211 to demand the network server 40 to download the monitor profile of the monitor of the network terminal 10 to the terminal side.

In a step S1300, the monitor description information of the monitor of the network terminal 10 is obtained from the monitor description information storage unit 11, and the flow advances to a step S1301.

In the step S1301, the profile storage unit 42 of the network server 40 is accessed, and the flow advances to a step S1302.

In the step S1302, the profile which has the profile description information coincident with the monitor description information is searched and obtained, and then the process terminates.

As above, it becomes possible to demand the network server 40 to download the monitor profile of the monitor of the network terminal 10 to the terminal side.

Figure 31:
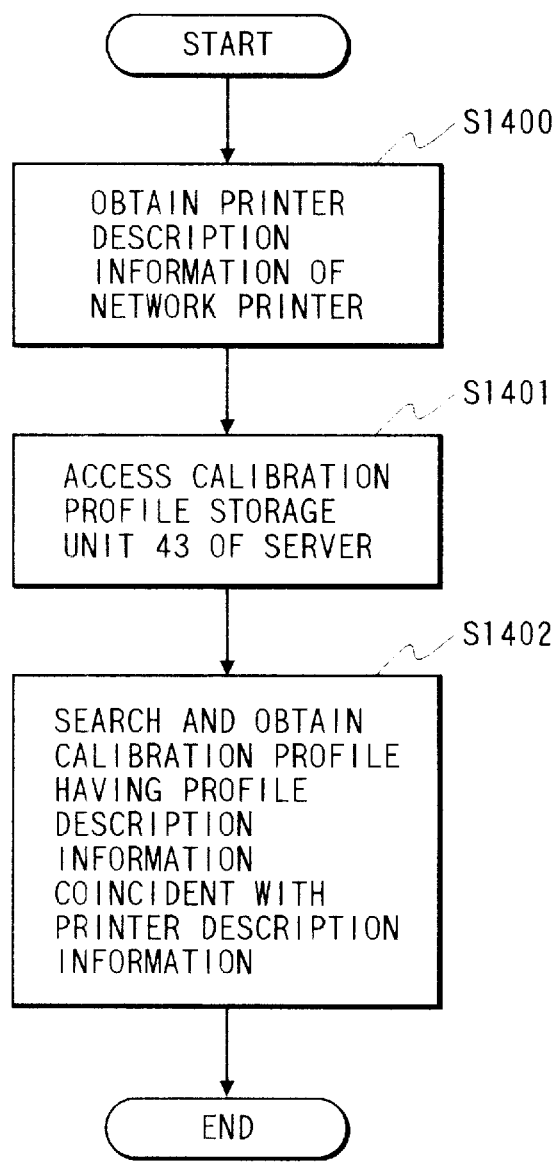
FIG. 31 is a flow chart showing a detailed process for demanding the network server 40 to download the printer profile in which the calibration data of the network printer 50 has been stored, to the terminal side.

FIG. 31 is a flow chart showing in detail the processes in the steps S1204 and S1212 to demand the network server 40 to download the printer profile of the network printer 50 in which the calibration data has been stored, to the terminal side.

In a step S1400, the printer description information of the network printer 50 is obtained from the printer description information storage unit 12, and the flow advances to a step S1401.

In the step S1401, the calibration profile storage unit 43 of the network server 40 is accessed, and the flow advances to a step S1402.

In the step S1402, the printer profile which has the profile description information coincident with the printer description information and in which the calibration data has been stored is obtained, and then the process terminates.

As above, it becomes possible to demand the network server 40 to download the printer profile of the network printer 50 in which the calibration data has been stored, to the terminal side.

Figure 32:
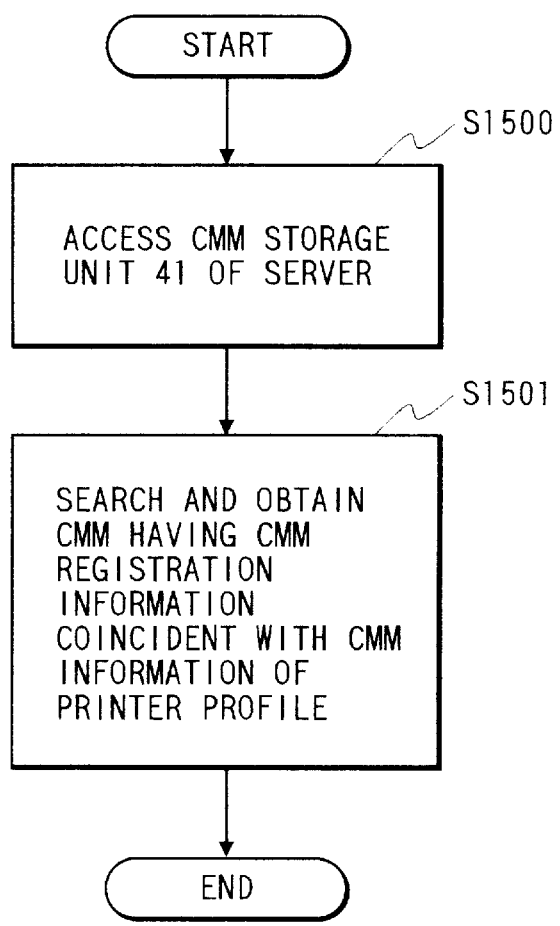
FIG. 32 is a flow chart showing a detailed process for demanding the network server 40 to download a CMM (color management module) used for the color matching process, to the terminal side.

FIG. 32 is a flow chart showing in detail the process in the step S1206 or S1214 to demand the network server 40 to download the CMM used in the color matching process, to the terminal side.

In a step S1500, the CMM storage unit 41 of the network server 40 is accessed, and the flow advances to a step S1501.

In the step S1501, it is searched and obtained the CMM which was obtained in the step S1205 or S1213 and has the CMM registration information coincident with the CMM information of the printer profile in which the calibration data has been stored, and then the process terminates.

As above, it becomes possible to demand the network server 40 to download the CMM used in the color matching process, to the terminal side.

Third Embodiment

In the third embodiment, the embodiment which is different from the first embodiment and has a calibration process function in a network system will be explained.

Figure 33:
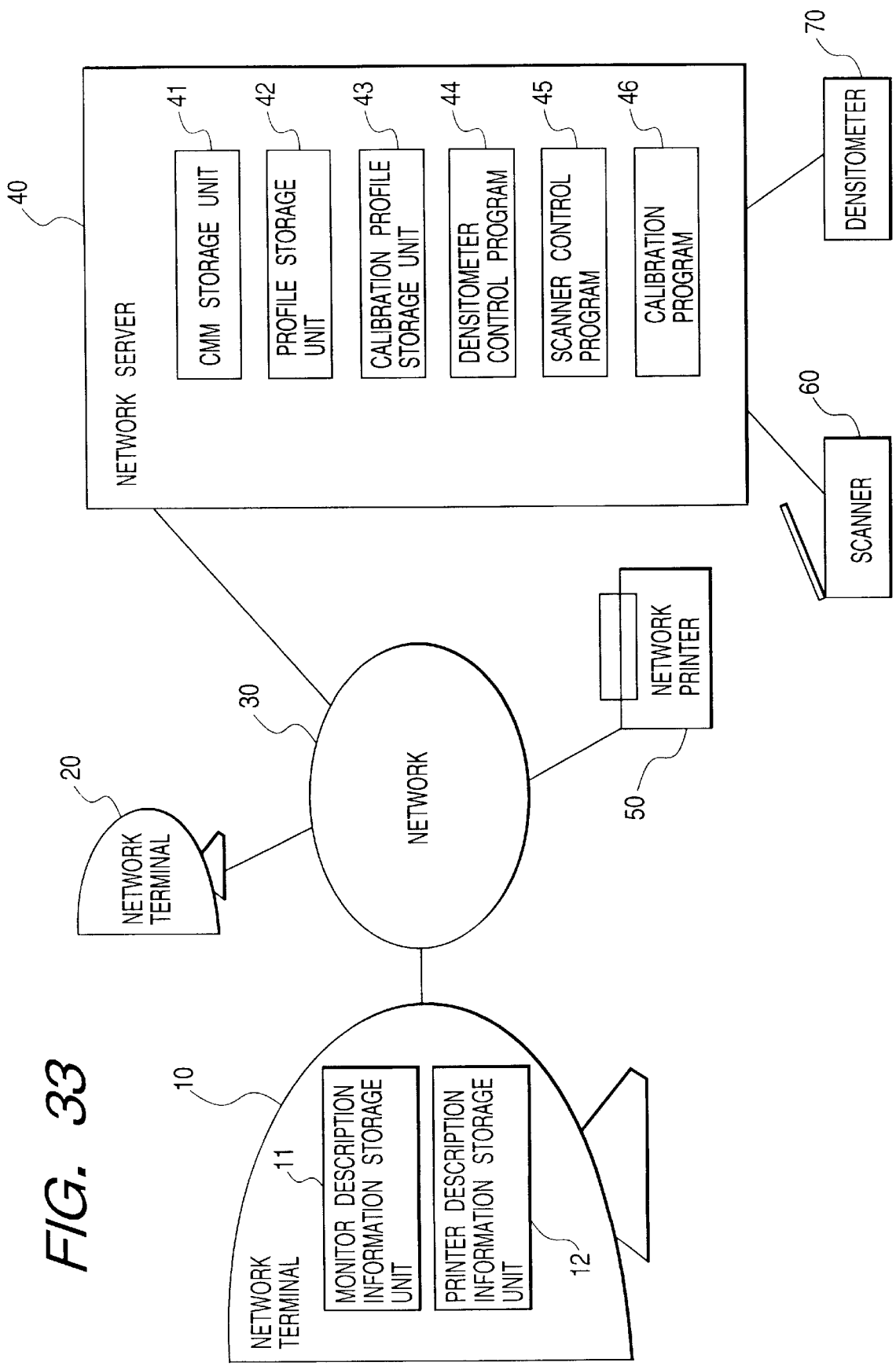
FIG. 33 is a view showing structure of a network system according to a third embodiment.

FIG. 33 is a view showing the structure of the network system according to the third embodiment. In FIG. 33, it should be noted that the same components as those in the second embodiment are added with the same reference numerals, respectively.

As shown in FIG. 33, the network system according to the present embodiment is composed of network terminals 10 and 20, a network server 40, a network printer 50, a scanner 60, a densitometer 70, and a network 30 to which the network terminals 10 and 20, the network server 40 and the network printer 50 are connected.

The network terminal 10 has a CPU, a VRAM and the like necessary for monitor displaying and image processing, and a communication function necessary for the communication in the network. Further, the network terminal 10 has a monitor description information storage unit 11 for discriminating a monitor and a printer description information storage unit 12 for discriminating the network printer 50.

The network server 40 has a CPU, a RAM, a hard disk and the like necessary for image processing and printing processing, and a communication function necessary for communication in the network. Further, the network server 40 has a CMM storage unit 41 in which n (n is constant) CMMs have been registered, a profile storage unit 42 in which m (m is constant) device profiles (monitor, scanner and printer) have been stored, a calibration profile storage unit 43 in which a printer profile containing therein calibration data has been stored, a densitometer control program 44 which has a function for controlling the densitometer to measure the density of the color patch output and obtaining or capturing the measured data, a scanner control program 45 which has a function for controlling the scanner to read the color patch output and obtaining or capturing the read data, and a calibration program 46 which has a function for generating the calibration data based on the data obtained by the densitometer control program 44 and the scanner control program 45.

The scanner 60 and the densitometer 70 are connected to the network server 40.

Each CMM registered or stored in the CMM storage unit 41 has registration information (e.g., four-byte English numerals: UCCM) for discrimination.

FIG. 24 shows the user interface (dialog) which is used in case of causing a user to select calibration accuracy when the calibration program 46 is executed. In this case, if the user wishes the accuracy higher than ordinary accuracy, he may select "high".

Figure 34:
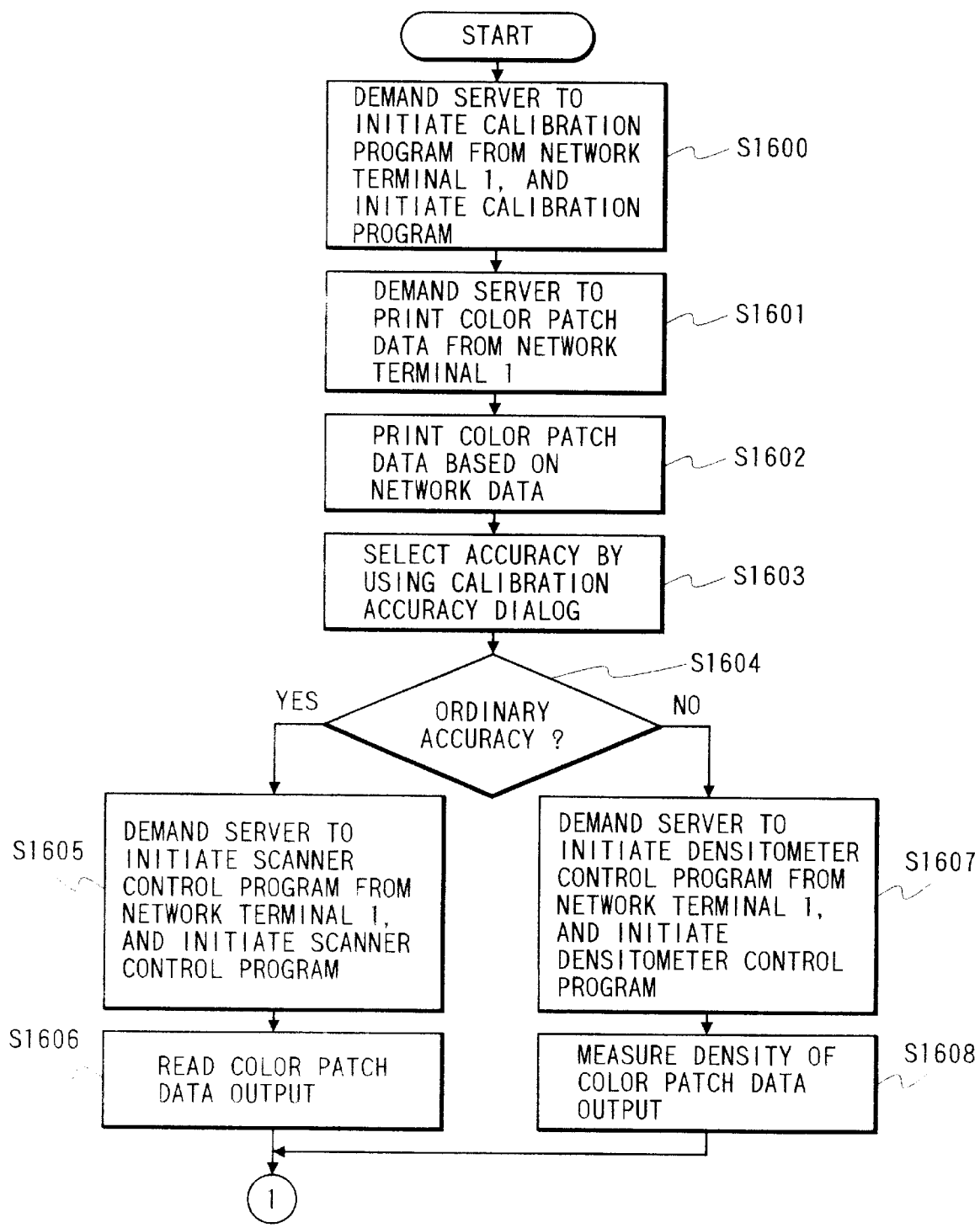
FIG. 34 is a flow chart showing a process wherein calibration data of a network printer 50 is generated by a network server 40 and then the generated data is stored in a printer profile to form and store a calibration profile.
Figure 35:
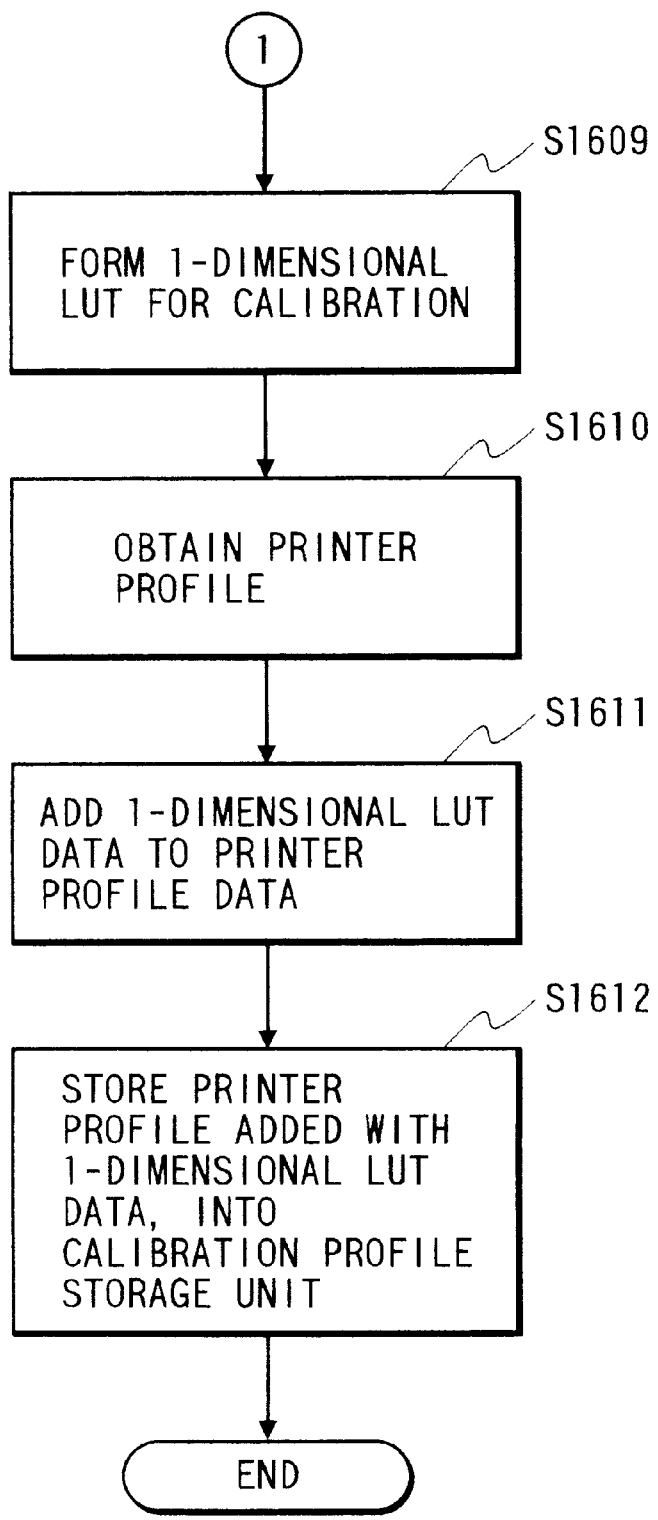
FIG. 35 is a flow chart showing the process wherein the calibration data of the network printer 50 is generated by the network server 40 and then the generated data is stored in the printer profile to form and store the calibration profile.

FIGS. 34 and 35 are flow charts showing a process in the network server 40, wherein the calibration data of the network printer 50 is generated, a calibration profile is formed and stored by storing the generated calibration data into the printer profile.

In a step S1600, the network terminal 10 demands the server 40 to initiate the calibration program 46, and the flow advances to a step S1601.

In the step S1601, the network terminal 10 demands the server 40 to print color patch data for generating the calibration by using the network printer 50, and the flow advances to a step S1602.

In the step S1602, the color patch data is printed by the network printer 50, and the flow advances to a step S1603.

In the step S1603, the calibration program 46 is initiated, the dialog for selecting the calibration accuracy in FIG. 24 is displayed according to the initiated program, and the user selects the accuracy. Then, the flow advances to a step S1604.

In the step S1604, if the user selects the ordinary accuracy, the flow advances to a step S1605. In the step S1605, the network terminal 10 demands the server 40 to initiate the scanner control program 45 in the server 40, and the flow advances to a step S1606.

In the step S1606, the color patch data output printed in the step S1602 is read by the scanner 60, and the flow advances to a step S1609.

In the step S1604, if the user selects the high accuracy, the flow advances to a step S1607 to demand the network terminal 10 to initiate the densitometer control program 44 in the server 40, and the program is initiated. Then, the flow advances to a step S1608.

In the step S1608, the color patch data output printed in the step S1602 is read by the densitometer 70, and the flow advances to the step S1609.

In the step S1609, based on the data obtained in the step S1606 or S1608, the one-dimensional LUT data shown in FIG. 22 is generated according to the calibration program 46, and the flow advances to a step S1610.

In the step S1610, the printer profile of the network printer 50 is obtained from the profile storage unit 42 in the server 40, by the server 40. Then, the flow advances to a step S1611.

In the step S1611, the one-dimensional LUT data generated in the step S1609 is stored in the printer profile obtained in the step S1610, and the flow advances to a step S1612.

In the step S1612, the printer profile in which the one-dimensional LUT data has been additionally stored is stored in the calibration profile storage unit 43 in the server 40, and the process terminates.

As above, it becomes possible to initiate the calibration program in the server 40, generate the calibration data in the server 40, and then add the generated data to the printer profile.

Figure 36:
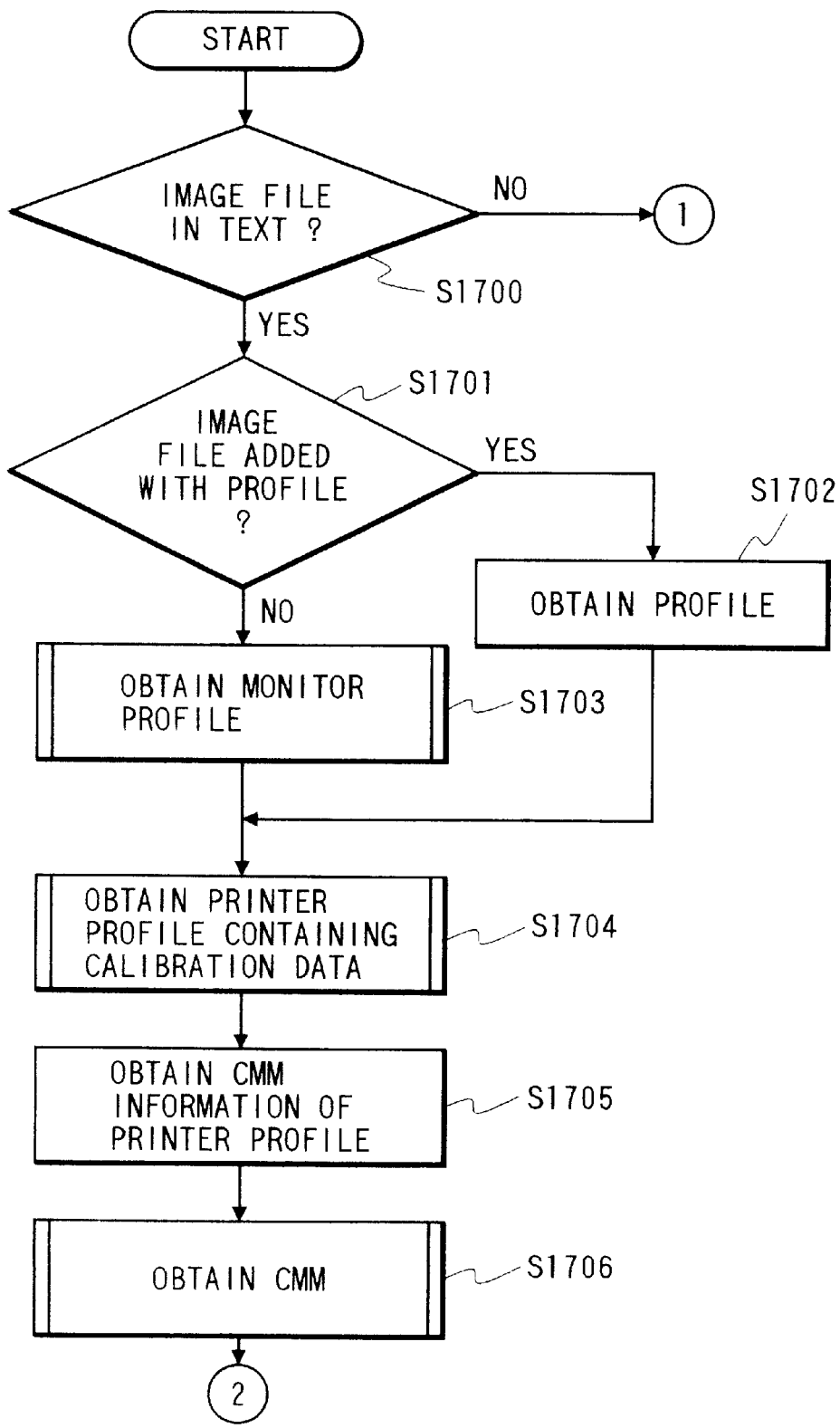
FIG. 36 is a flow chart showing a process wherein, in case of printing a text by using the network printer 50, a color matching process on data in the text is performed by the network server 40 by using the formed calibration profile and then the processed data is outputted to the network printer 50.
Figure 37:
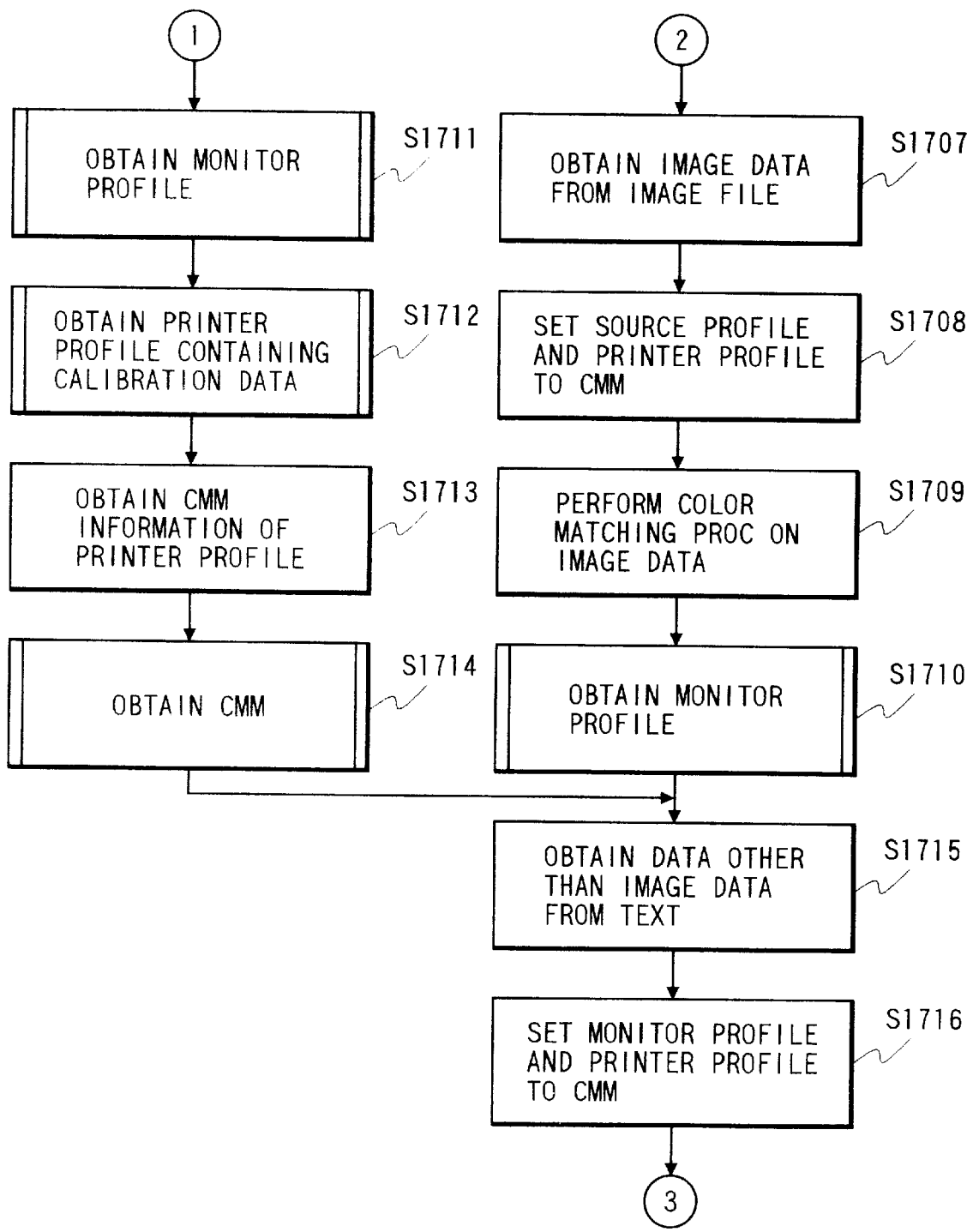
FIG. 37 is a flow chart showing the process wherein, in case of printing the text by using the network printer 50, the color matching process on the data in the text is performed by the network server 40 by using the formed calibration profile and then the processed data is outputted to the network printer 50.
Figure 38:
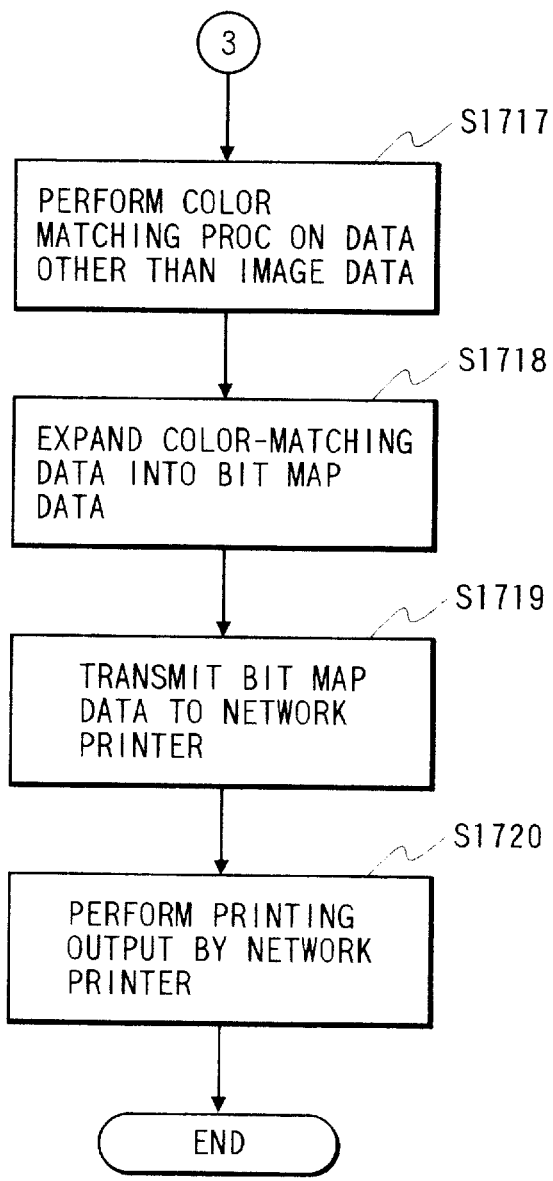
FIG. 38 is a flow chart showing the process wherein, in case of printing the text by using the network printer 50, the color matching process on the data in the text is performed by the network server 40 by using the formed calibration profile and then the processed data is outputted to the network printer 50.

FIGS. 36 to 38 are flow charts showing a process wherein, in case of printing the text by using the network printer 50, the color matching process on the data in the text is performed by the network server 40 us with use of the calibration profile formed in the process of FIGS. 34 and 35, and then the processed data is outputted to the network printer 50.

In a step S1700, it is checked whether or not the image file exists in the text to be printed.

If the image file does not exist, it can be considered that all the data in the text were generated or formed on the monitor. Therefore, the color matching process between the monitor of the network terminal 10 and the network printer 50 is performed.

In a step S1711, the monitor profile of the monitor in the network terminal 10 is obtained in the network server 40, and the flow advances to a step S1712.

In the step S1712, the printer profile of the network printer 50 in which the calibration data has been stored is obtained from the calibration profile storage unit 43 to the network server 40, and the flow advances to a step S1713.

In the step S1713, the CMM information of the header portion of the downloaded printer profile is obtained, and the flow advances to a step S1714.

In the step S1714, the CMM coincident with the CMM information obtained in the step S1713 is obtained in the network server 40, and the flow advances to a step S1715.

If the image file exists in the step S1700, the flow advances to a step S1701 to check whether or not the profile is added to the above image file.

If the profile is added, the flow advances to a step S1702 to obtain the device profile, and then the flow advances to a step S1704.

Such profile is the profile for the scanner, the monitor or the like, and thus managed as the source profile.

If the profile is not added in the step S1701, the flow advances to a step S1703 to obtain the monitor profile of the monitor in the network terminal 10 by the network server 40, and then the flow advances to the step S1704.

In the step S1704, the printer profile of the network printer 50 in which the calibration data has been stored is obtained from the calibration profile storage unit 43 by the server 40, and the flow advances to a step S1705.

In the step S1705, the CMM information of the header portion of the obtained printer profile is obtained, and the flow advances to a step S1706.

In the step S1706, the CMM coincident with the CMM information obtained in the step S1705 is obtained from the CMM storage unit 41 by the server 40, and the flow advances to a step S1707.

In the step S1707, the image data is obtained from the image file in the test, and the flow advances to a step S1708.

In the step S1708, the source profile obtained in the step S1702 or S1703 and the printer profile obtained in the step S1704 are set to the CMM, and the flow advances to a step S1709.

In the step S1709, the color matching process on the image data obtained in the step S1707 is performed on the side of the server 40 by using the CMM obtained in the step S1708.

By such process up to this time, as can be understood, it becomes possible to obtain the necessary source profile, the printer profile in which the calibration data has been stored, and the CMM, by the network server 40, and further perform the color matching process on the image data in the text on the side of the network server 40.

Further, in a step S1710, the monitor profile of the monitor in the network terminal 1 is obtained by the network server 40, and the flow advances to the step S1715.

In the step S1715, the data (character, graphics or the like) other than the image in the text is obtained, and the flow advances to a step S1716.

In the step S1716, the monitor profile (i.e., source profile) downloaded in the step S1710 or S1711 and the printer profile obtained by the server 40 in the step S1704 or S1712 are set to the CMM, and the flow advances to a step S1717.

In the step S1717, the color matching process on the data other than the image obtained in the step S1715 is performed by using the CMM obtained in the step S1716, and the flow advances to a step S1718.

By such process up to this time, as can be understood, it becomes possible to obtain the necessary source profile, the printer profile containing the calibration data, and the CMM, by the server 40, and then perform the color matching process on the data other than the image in the text on the side of the server 40.

In the step S1718, the data subjected to the color matching in the steps S1709 and S1717 are expanded into the bit map data in the server 40 such that the expanded data can be outputted by the network printer 50, and the flow advances to a step S1719.

In the step S1719, the bit map data expanded in the step S1718 is transmitted from the network server 40 to the network printer 50 through the network 30, and the flow advances to a step S1720.

In the step S1720, the bit map data transmitted in the step S1719 is received and printed by the network printer 50, and then the process terminates.

As above, it becomes possible to obtain the necessary source profile, the printer profile containing the calibration data, and the CMM, by the network server 40, perform the color matching process (including calibration process) on the image data in the text and the data other than the image on the side of the network server 40, and then print the processed data by the network printer 50.

Figure 39:
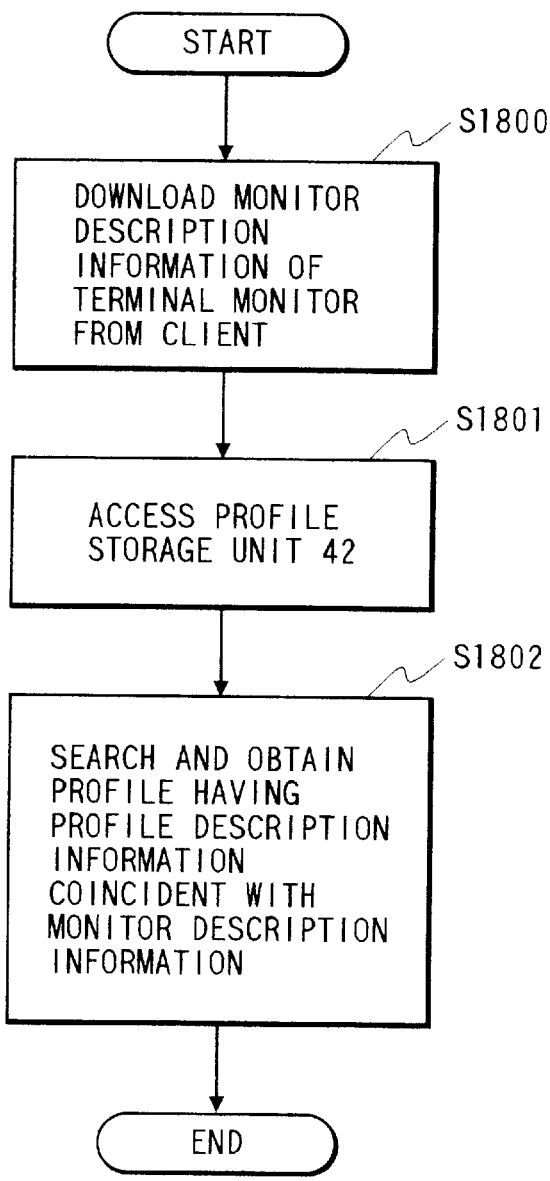
FIG. 39 is a flow chart showing a detailed process wherein a monitor profile of a monitor of a network terminal 10 is obtained by the network server 40.

FIG. 39 is a flow chart showing in detail the processes in the steps S1703, S1710 and S1711 wherein the monitor profile of the monitor of the network terminal 10 is obtained in the network server 40.

In a step S1800, the monitor description information of the monitor of the network terminal 10 stored in the monitor description information storage unit 11 is downloaded from the network terminal 10, and the flow advances to a step S1801.

In the step S1801, the profile storage unit 42 of the network server 40 is accessed, and the flow advances to a step S1802.

In the step S1802, the profile which has the profile description information coincident with the monitor description information is searched and obtained, and then the process terminates.

As above, it becomes possible to obtain the monitor profile of the monitor of the network terminal 10 by the network server 40.

FIG. 40 is a flow chart showing in detail the processes in the steps S1704 and S1712 wherein the printer profile of the network printer 50 in which the calibration data has been stored is obtained in the network server 40.

In a step S1900, the printer description information of the network printer 50 stored in the printer description information storage unit 12 is downloaded from the network terminal 10, and the flow advances to a step S1901.

In the step S1901, the calibration profile storage unit 43 of the network server 40 is accessed, and the flow advances to a step S1902.

In the step S1902, the printer profile which has the profile description information coincident with the printer description information and in which the calibration data has been stored is obtained, and then the process terminates.

As above, it becomes possible to obtain the printer profile of the network printer 50 in which the calibration data has been stored, by the network server 40.

FIG. 41 is a flow chart showing in detail the process in the step S1706 or S1714 wherein the CMM used in the color matching process is obtained in the network server 40.

In a step S1910, the CMM storage unit 41 of the network server 40 is accessed, and the flow advances to a step S1911.

In the step S1911, it is searched and obtained the CMM which was obtained in the step S1705 or S1713 and has the CMM registration information coincident with the CMM information of the printer profile in which the calibration data has been stored, and then the process terminates.

As above, it becomes possible to obtain the CMM used in the color matching process, by the network server 40.

Other Embodiments

The invention employed by a method wherein program codes of a software to realize the functions of the above-described embodiments are supplied to a computer in an apparatus or a system connected to various devices so as to make the devices operative in order to realize the functions of the above-described embodiments and the various devices are operated in accordance with the programs stored in the computer (CPU or MPU) of the system or apparatus is also included in the scope of the present invention.

In such case, the program codes themselves of the software realize the functions of the above-described embodiments and the program codes themselves and means for supplying the program codes to the computer, e.g., a storage medium in which the program codes have been stored, construct the present invention.

As such a memory medium to store the program codes, e.g., it is possible to use a floppy disk, a hard disk, an optical disk, a magneto-optical disk, a CD-ROM, a magnetic tape, a nonvolatile memory card, a ROM or the like can be used.

Also, even in not only a case where the functions of the above-described embodiments are realized by executing the supplied program codes by the computer but also a case where the functions of the above-described embodiment are realized in cooperation with the OS (operating system) by which the program codes operate in the computer or another application software or the like, such program codes are of course included in the scope of the present invention.

Further, of course, the present invention also includes a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiment are realized by the processes.

The present invention has been described in connection with the above preferred embodiments. However, the present invention is not limited only to the above-described embodiments, but various modifications are possible without departing from the scope of the appended claims.

What is claimed is:

1. An image processing apparatus connected to a network server through network, comprising:
   a communication unit for communicating with said network server;
   a reception unit for receiving from said network server a list of device profiles stored in said network server, by using said communication unit;
   a selector for selecting from said list a desired destination device profile, based on user's instructions;
   a transmitter for requesting the selected destination device profile to said network server and downloading the selected device profile and requesting to said network server a color management module according to information described in the downloaded destination device profile and downloading the color management module from said network server by using said communication unit; and
   a processor for performing a color matching process by using a source device profile and the downloaded destination device profile on a basis of the downloaded color management module.

2. An apparatus according to claim 1, wherein
   both a source profile and a destination profile are used in the color matching process, and the downloaded device profile is set as the source profile,
   said network server stores the plural different color management modules, and
   the downloaded color management module is selected from among the plural color management modules stored in said network server, based on information of the destination profile.

3. An apparatus according to claim 1, wherein the device profile is calibrated by using a calibration program downloaded from said network server.

4. An apparatus according to claim 3, wherein the calibrated device profile is transferred to said network server by said communication means.

5. An apparatus according to claim 4, wherein the network server stores the device profile and the calibrated device profile independently of each other.

6. An image processing method for an image processing apparatus connected to a network server through a network, said method comprising:
   a communication step of communication with the network server;
   a reception step of receiving from the network server a list of device profiles stored in the network server, through said communication step;
   a selection step of selecting from the list a desired destination device profile, based on user's instructions;
   a transmission step of requesting the selected destination device profile to the network server and downloading the selected device profile, and requesting to said network server a color management module according to information described in the downloaded destination device profile and downloading the color management module from said network server by using said communication step; and
   a color matching process step of performing a color matching process by using a source device profile and the downloaded device destination device profile on a basis of the downloaded color management module.

7. A storage medium which stores a computer readable program for realizing an image processing method for an image processing apparatus connected to a network server through a network, said method comprising:
   a communication step of communicating with the network server;
   a reception step of receiving from the network server a list of device profiles stored in the network server, through said communication step;
   a selection step of selecting from the list a desired destination device profile, based on user's instruction;
   a transmission step of requesting the selected destination device profile to the network server and downloading the selected device profile, and requesting to said network server a color management module according to information described in the downloaded destination device profile and downloading the color management module from said network server by using said communication step; and
   a color matching process step of performing a color matching process by using a source device profile and the downloaded destination device profile on a basis of the downloaded color management module.

8. An apparatus according to claim 1, further comprising input means for inputting an input image constituted by an image file and a text file,
   wherein said color matching process means performs the color matching process on data of the image file but does not perform the color matching process on data of the text file.

9. A network server which is connected through a network to a client performing color matching, comprising:
   communication means for communicating with said client;
   storage means for storing device profiles and a color management module;
   first transmission means for transmitting, to said client, a list of device profiles stored in said network server by using said communication means;
   first reception means for receiving, from said client, information representing a desired device profile selected from said list of device profiles, by using said communication means;
   second transmission means for transmitting, to said client, said selected device profile; and
   second reception means for receiving, from said client, information representing a desired color management module, said color management module corresponding to information described in the transmitted device profile.

10. An image processing method for a network server connected through a network to a client performing color matching, said method comprising:
    a communication step of communicating with said client;
    a storage step of storing device profiles and a color management module;

a first transmission step of transmitting, to said client, a list of device profiles stored in the network server through said communication step;

a first reception step of receiving, from said client, information representing a desired device profile selected from the list of device profiles, through said communication step;

a second transmission step of transmitting, to said client, the selected device profile; and a second reception step of receiving, from said client, information representing a desired color management module, said color management module corresponding to information described in the transmitted device profile.

11. A storage medium which store a computer readable program for realizing an image processing method for a network server connected through a network to a client performing color matching, said method comprising:

a communication step of communicating with said client;

a storage step of storing device profiles and a color management module;

a first transmissions step of transmitting, to said client, a list of device profiles stored in the network server through said communication step;

a first reception step of receiving, from said client, information representing a desired device profile selected from the list of device profiles, through said communication step;

a second transmission step of transmitting, to said client, the selected device profile; and a second reception step of receiving, from said client, information representing a desired color management module, said color management module corresponding to information described in the transmitted device profile.

* * * * *

UNITED STATES PATENT AND TRADEMARK OFFICE
CERTIFICATE OF CORRECTION

PATENT NO. : 6,337,922 B2
DATED : January 8, 2002
INVENTOR(S) : Shuichi Kumada

Page 1 of 1

It is certified that error appears in the above-identified patent and that said Letters Patent is hereby corrected as shown below:

Title page,
Item [30], Foreign Application Priority Data,
"Jan. 16, 1997" should read -- Jan. 16, 1998 --.

Column 7,
Line 13, "read" should read -- reads --.

Column 13,
Line 3, "4G" should read -- 40 --.

Column 17,
Line 58, "us" should be deleted.

Column 18,
Line 42, "test," should read -- text, --.

Column 23,
Line 17, "store" should read -- stores --.

Signed and Sealed this

Twenty-first Day of May, 2002

Attest:

Attesting Officer

JAMES E. ROGAN
*Director of the United States Patent and Trademark Office*